US012812343B2

(12) United States Patent
Sridhara et al.

(10) Patent No.: US 12,812,343 B2
(45) Date of Patent: Nov. 24, 2026

(54) LOW ENERGY PACKET SCHEDULING

(71) Applicant: QUALCOMM Incorporated, San Diego, CA (US)

(72) Inventors: Srivathsa Sridhara, Bangalore (IN); Vishal Agarwal, Bangalore (IN); Mayank Batra, Cambridge (GB)

(73) Assignee: QUALCOMM Incorporated, San Diego, CA (US)

(*) Notice: Subject to any disclaimer, the term of this patent is extended or adjusted under 35 U.S.C. 154(b) by 306 days.

(21) Appl. No.: 18/510,279

(22) Filed: Nov. 15, 2023

(65) Prior Publication Data

US 2025/0159449 A1 May 15, 2025

(51) Int. Cl.
*H04W 4/80* (2018.01)

(52) U.S. Cl.
CPC .................................... *H04W 4/80* (2018.02)

(58) Field of Classification Search
CPC ...... H04W 4/80; H04W 28/02; H04L 1/1671; H04L 1/1685
See application file for complete search history.

(56) References Cited

U.S. PATENT DOCUMENTS 10,856,297 B2 12/2020 Chen
2020/0252162 A1* 8/2020 Denboer ............... H04L 69/324
2022/0039041 A1 2/2022 Zhu
2023/0299925 A1* 9/2023 Bonde .................. H04L 1/1825 370/329
2024/0063981 A1* 2/2024 Liu ...................... H04R 1/1016
2024/0089715 A1* 3/2024 Haggai ............... H04W 56/001
2024/0187137 A1* 6/2024 Serikar ................ H04W 24/02
2025/0048460 A1* 2/2025 Lee ......................... H04L 69/22
2025/0113314 A1* 4/2025 Mysore ............. H04W 56/0015
2025/0119931 A1* 4/2025 Yoo ....................... H04L 65/752

FOREIGN PATENT DOCUMENTS

WO 2023038505 A1 3/2023

OTHER PUBLICATIONS

International Search Report and Written Opinion—PCT/US2024/051380—ISA/EPO—Jan. 30, 2025.
Woolley M, "The Bluetooth Low Energy Primer", Bluetooth, Jun. 6, 2022, 87 Pages, XP093070516, Section 7.7.

* cited by examiner

*Primary Examiner* — Angelica Perez
(74) *Attorney, Agent, or Firm* — Harrity & Harrity, LLP

(57) ABSTRACT

Various aspects of the present disclosure generally relate to wireless communication. In some aspects, a wireless device may receive a data packet on an isochronous (ISO) link. The wireless device may transmit a low energy (LE) packet with feedback for the data packet. Numerous other aspects are described.

26 Claims, 13 Drawing Sheets

LOW ENERGY PACKET SCHEDULING

FIELD OF THE DISCLOSURE

Aspects of the present disclosure generally relate to wireless communication and to techniques and apparatuses associated with low energy packets transmitted and received by peripheral devices.

BACKGROUND

A wireless personal area network (WPAN) is a short-range wireless network typically established by a user to interconnect various personal devices, sensors, and/or appliances located within a certain distance or area of the user. For example, a WPAN based on a communication protocol such as a Bluetooth® (BT) protocol, a Bluetooth Low Energy (BLE) protocol, or a Zigbee® protocol may provide wireless connectivity to peripheral devices that are within a specific distance (e.g., 5 meters, 10 meters, 20 meters, 100 meters) of each other. Bluetooth is a short-range wireless communication protocol that supports a WPAN between a central device (such as a host device or a source device) and at least one peripheral device (such as a client device or a sink device). However, power consumption associated with Bluetooth communications that operate on a basic rate (BR) and/or enhanced data rate (EDR) physical layer may render WPAN communication impractical in certain applications.

Accordingly, to address the power consumption challenges associated with Bluetooth BR/EDR (sometimes referred to as a Bluetooth classic or Bluetooth legacy protocol), Bluetooth Low Energy (BLE) (also referred to herein as WPAN LE) was developed and adopted in various applications in which data transfers are relatively infrequent and/or to enable WPAN communication with low power consumption. For example, BLE exploits infrequent data transfer by using a low duty cycle operation and placing one or both of the central device and the peripheral device(s) into a sleep mode between data transmissions, thereby conserving power. Example applications that use BLE include battery-operated sensors and actuators in various medical, industrial, consumer, and fitness applications. BLE may also be used to connect devices such as BLE-enabled smartphones, tablets, laptops, earbuds, or the like. While traditional (or classic) Bluetooth and BLE offer certain advantages, there exists a need for further improvements in Bluetooth and BLE technology. For example, traditional Bluetooth and BLE have a limited range, have a limited data capacity throughput, and are susceptible to interference from other devices communicating in the same frequency band (such as via wireless local area network (WLAN) communications).

SUMMARY

Some aspects described herein relate to a method of wireless communication performed by a wireless device. The method may include receiving a data packet on an isochronous (ISO) link. The method may include transmitting a low energy (LE) packet with feedback for the data packet.

Some aspects described herein relate to a method of wireless communication performed by a wireless device. The method may include transmitting a first set of ISO data packets on an ISO link. The method may include receiving a second set of ISO data packets on the ISO link. The method may include receiving a first set of feedback packets for the first set of ISO data packets. The method may include transmitting a second set of feedback packets for the second set of ISO data packet. The method may include transmitting an LE packet earlier than an LE event prescheduled for transmitting the LE packet.

Some aspects described herein relate to an apparatus for wireless communication at a wireless device. The apparatus may include one or more memories and one or more processors coupled to the one or more memories. The one or more processors may be individually or collectively configured to cause the wireless device to receive a data packet on an ISO link. The one or more processors may be individually or collectively configured to cause the wireless device to transmit an LE packet with feedback for the data packet.

Some aspects described herein relate to an apparatus for wireless communication at a wireless device. The apparatus may include one or more memories and one or more processors coupled to the one or more memories. The one or more processors may be individually or collectively configured to cause the wireless device to transmit a first set of ISO data packets on an ISO link. The one or more processors may be individually or collectively configured to cause the wireless device to receive a second set of ISO data packets on the ISO link. The one or more processors may be configured to receive a first set of feedback packets for the first set of ISO data packets. The one or more processors may be individually or collectively configured to cause the wireless device to transmit a second set of feedback packets for the second set of ISO data packet. The one or more processors may be individually or collectively configured to cause the wireless device to transmit an LE packet earlier than an LE event prescheduled for transmitting the LE packet.

Some aspects described herein relate to a non-transitory computer-readable medium that stores a set of instructions for wireless communication by a wireless device. The set of instructions, when executed by one or more processors of the wireless device, may cause the wireless device to receive a data packet on an ISO link. The set of instructions, when executed by one or more processors of the wireless device, may cause the wireless device to transmit an LE packet with feedback for the data packet.

Some aspects described herein relate to a non-transitory computer-readable medium that stores a set of instructions for wireless communication by a wireless device. The set of instructions, when executed by one or more processors of the wireless device, may cause the wireless device to transmit a first set of ISO data packets on an ISO link. The set of instructions, when executed by one or more processors of the wireless device, may cause the wireless device to receive a second set of ISO data packets on the ISO link. The set of instructions, when executed by one or more processors of the wireless device, may cause the wireless device to receive a first set of feedback packets for the first set of ISO data packets. The set of instructions, when executed by one or more processors of the wireless device, may cause the wireless device to transmit a second set of feedback packets for the second set of ISO data packet. The set of instructions, when executed by one or more processors of the wireless device, may cause the wireless device to transmit an LE packet earlier than an LE event prescheduled for transmitting the LE packet.

Some aspects described herein relate to an apparatus for wireless communication. The apparatus may include means for receiving a data packet on an ISO link. The apparatus may include means for transmitting an LE packet with feedback for the data packet.

Some aspects described herein relate to an apparatus for wireless communication. The apparatus may include means for transmitting a first set of ISO data packets on an ISO link. The apparatus may include means for receiving a second set of ISO data packets on the ISO link. The apparatus may include means for receiving a first set of feedback packets for the first set of ISO data packets. The apparatus May include means for transmitting a second set of feedback packets for the second set of ISO data packet. The apparatus may include means for transmitting an LE packet earlier than an LE event prescheduled for transmitting the LE packet.

Aspects generally include a method, apparatus, system, computer program product, non-transitory computer-readable medium, user equipment, base station, network entity, network node, central device, peripheral device, wireless communication device, access point, mobile station, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
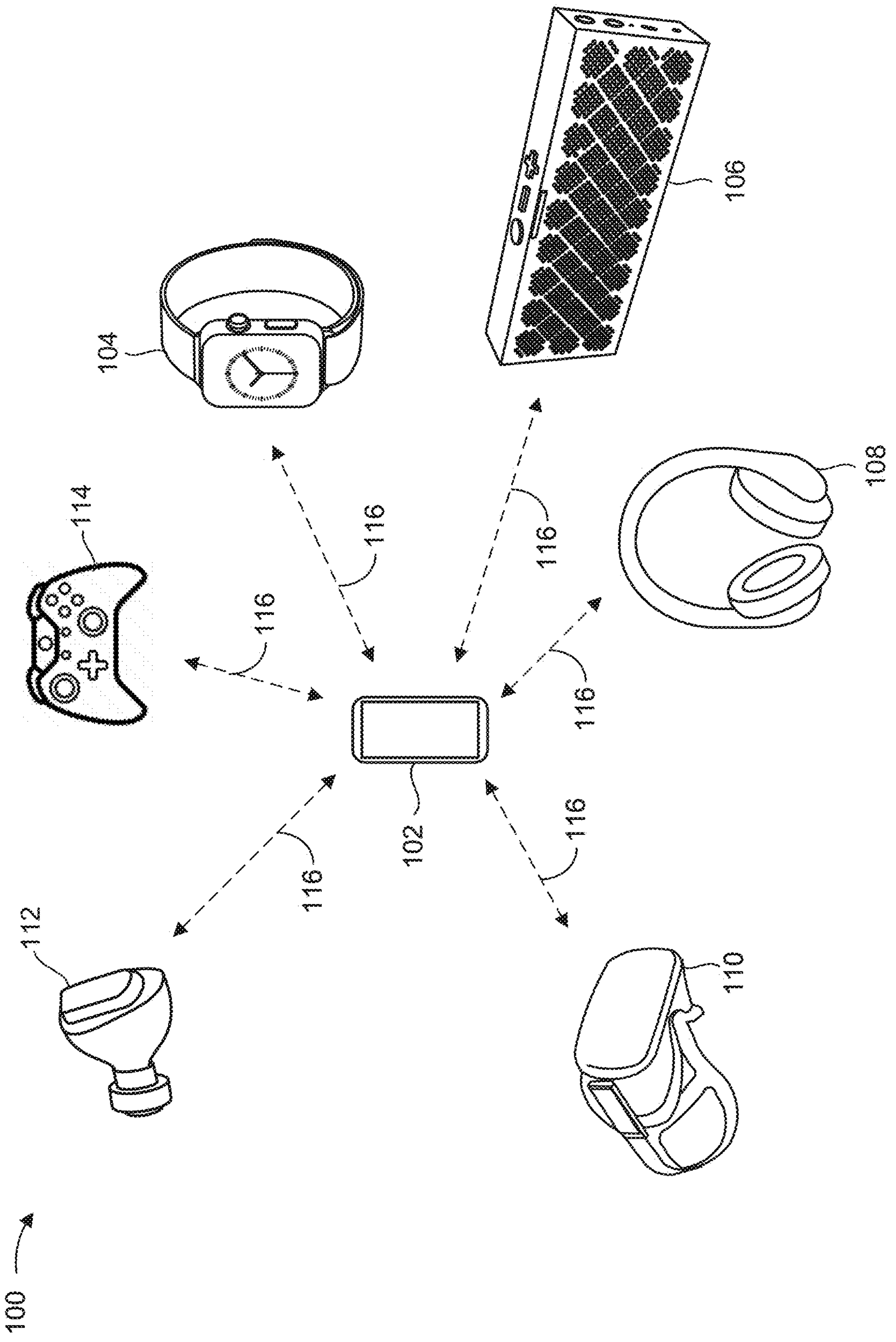
FIG. 1 is a diagram illustrating an example of a wireless personal area network (WPAN), in accordance with the present disclosure.

In a wireless personal area network (WPAN), such as a Bluetooth (BT) network or a Bluetooth Low Energy (BLE) network, wireless audio or video may stream from a central device (e.g., a handset, a smartphone, a gaming console) to one or more peripheral devices (e.g., a left earbud, a right earbud, an extended reality (XR) headset, XR glass, wearable device, portable speaker). The central device may stream audio or video to peripheral devices on low energy (LE) isochronous (ISO) links (e.g., connected ISO (CIS) links). For example, the central device may transmit ISO data (e.g., audio data, video data) in an ISO data packet on an ISO link. A peripheral device may also transmit ISO data (e.g., controller input) in an ISO data packet to the central device. The central device and the peripheral device may transmit feedback (e.g., ISO acknowledgement (ACK)) for the ISO data packets.

LE packets may include sensor data from the peripheral device or control information from the central device. The peripheral device may collect sensor data (e.g., orientation data, proximity data) and transmit the sensor data (e.g., LE data) with any other LE data in an LE packet to the central device. The central device may transmit LE control information (e.g., LE control) in an LE packet to the peripheral device. LE packets may be prescheduled to be transmitted during an LE event. An anchor point may mark a beginning of the LE event.

In use cases such as spatial audio or XR, LE packets are expected to be delivered on time for the best user experience. Sensor data on an earbud, XR headset, or XR glass may be sampled at a high rate to create accurate outputs for the user with low latency. Accordingly, applications may request aggressive LE parameters with an ISO link. For example, there may be a 20 millisecond (ms) LE interval to deliver sensor data from the peripheral device or to deliver control messages from the central device, along with a 7.5 ms or 10 ms ISO interval for ISO data. These interval times create several problems. The central device may not have sufficient contiguous time for WiFi activity by the central device and/or the peripheral device. Switching back and forth between WiFi and other signaling when multiple links are involved can cause a scheduling problem as the back and forth can fragment the time and/or bandwidth used for WiFi. With fragmented or insufficient bandwidth, latency may increase and signaling resources may not be used efficiently. Furthermore, there may not be enough bandwidth for other operations, in addition to the streaming and sensor exchange, such as proximity applications that constantly advertise the state of the peripheral device, linking to another computer, or earbud scanning. The peripheral device may not easily schedule multiple links to support multi-point use cases.

According to various aspects described herein, the devices may transmit LE packets earlier than a prescheduled LE event (one or more LE subevents at an LE interval), such as with the feedback for an ISO data packet in an ISO subevent. For example, the LE data or control information may piggyback on an ISO ACK in an ISO subevent. In some aspects, the transmitting device may transmit an indication that the LE packet is to be transmitted in an ISO subevent that is earlier than the prescheduled LE event. In some aspects, the transmitting device may transmit LE packets once all ISO data and feedback has been exchanged, which may be in a next ISO subevent. Transmitting the LE packet in the earlier ISO event, rather than in the later prescheduled LE event, may result in a lower bandwidth requirement and a higher probability of obtaining a larger window of ISO and LE inactivity that can be utilized for other signaling (e.g., WiFi, other links) or applications at the central device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a WPAN 100, according to some implementations. Within the WPAN 100, a central device 102 (which may be referred to herein as a source device or using other suitable terminology) may connect to and may establish a communication link 116 with one or more peripheral devices, such as a smartwatch 104, a Bluetooth portable speaker 106, wireless headphones 108, a head-mounted device (HMD) or XR reality headset 110, a wireless earbud 112, and/or a wireless game controller 114 (which may be referred to herein as sink devices or using other suitable terminology) using a BLE protocol or a modified BLE protocol. The BLE protocol is part of the BT core specification and enables radio frequency communication operating within the globally accepted 2.4 GHz Industrial, Scientific, and Medical (ISM) band.

In some aspects, as described herein, the central device 102 may include suitable logic, circuitry, interfaces, processors, and/or code that may be used to communicate with the one or more peripheral devices 104, 106, 108, 110, 112, and/or 114 using the BLE protocol or the modified BLE protocol. In some aspects, the central device 102 may operate as an initiator to request establishment of a link layer (LL) connection with an intended peripheral device 104, 106, 108, 110, 112, and/or 114. In some aspects, a link manager may be used to control operations between a WPAN application controller in the central device 102 and a WPAN application controller in each of the intended peripheral devices 104, 106, 108, 110, 112, and/or 114.

In some aspects, after a requested LL connection is established, the central device 102 may become a host device, and the selected or intended peripheral device 104, 106, 108, 110, 112, and/or 114 may become paired with the central device 102 over the established LL connection. As a host device, the central device 102 may support multiple concurrent LL connections with various peripheral devices 104, 106, 108, 110, 112, and/or 114 that are operating as client devices. For example, the central device 102 may manage various aspects of data packet communication in an LL connection with one or more associated peripheral devices 104, 106, 108, 110, 112, and/or 114. For example, the central device 102 may determine an operation schedule in the LL connection with one or more peripheral devices 104, 106, 108, 110, 112, and/or 114. The central device 102 may also initiate an LL protocol data unit (PDU) exchange sequence over the LL connection. LL connections may be configured to run periodic connection events in dedicated data channels. The exchange of LL data PDU transmissions between the central device 102 and one or more of the peripheral devices 104, 106, 108, 110, 112, and/or 114 may take place within connection events.

In some aspects, the central device 102 may be configured to transmit the first LL data PDU in each connection event to an intended peripheral device 104, 106, 108, 110, 112, and/or 114. Additionally, or alternatively, in some aspects, the central device 102 may utilize a polling scheme to poll the intended peripheral device 104, 106, 108, 110, 112, and/or 114 for an LL data PDU transmission during a connection event. The intended peripheral device 104, 106, 108, 110, 112, and/or 114 may transmit an LL data PDU upon receipt of a packet carrying an LL data PDU from the central device 102. In some other aspects, a peripheral device 104, 106, 108, 110, 112, and/or 114 may transmit an LL data PDU to the central device 102 without first receiving an LL data PDU from the central device 102.

Examples of the central device 102 may include a cellular phone, a smartphone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player, a camera, a game console, a tablet, a smart device, a wearable device (such as a smart watch or wireless headphones), a vehicle, a vehicle infotainment system or car kit, an electric meter, a gas pump, a toaster, a thermostat, a hearing aid, a blood glucose on-body unit, an Internet-of-Things (IoT) device, or the like.

Examples of the one or more peripheral devices 104, 106, 108, 110, 112, and/or 114 may include a cellular phone, a smartphone, an SIP phone, an STA, a laptop, a PC, a desktop computer, a PDA, a satellite radio, a global positioning system, a multimedia device, a video device, a digital audio player, a camera, a game console, a tablet, a smart device, a wearable device (e.g., a smart watch, wireless headphones, or wireless earbuds), a vehicle, a vehicle infotainment system or car kit, an electric meter, a gas pump, a toaster, a thermostat, a hearing aid, a blood glucose on-body unit, an IoT device, or the like. Although the central device 102 is illustrated in FIG. 1 as being in communication with six peripheral devices 104, 106, 108, 110, 112, and 114 in the WPAN 100, the central device 102 may communicate with more or fewer than six peripheral devices within the WPAN 100 without departing from the scope of the present disclosure.

In some aspects, a device implementing the BT protocol (e.g., the central device 102) may operate according to a first radio mode (e.g., a basic rate (BR)/enhanced data rate (EDR) radio mode), and a device implementing the BLE protocol may operate according to a second radio mode (e.g., the BLE radio mode). In some aspects, the central device 102 may be configured with dual radio modes, and therefore may be able to operate according to the BR/EDR mode or the BLE mode, for example, based on the type of short-range wireless communication in which the central device 102 may engage.

For example, in some aspects, the central device 102 may operate according to the BR/EDR mode for continuous streaming of data, for broadcast networks, for mesh networks, and/or for some other applications in which a relatively higher data rate may be more suitable. Additionally, or alternatively, the central device 102 may operate according to the BLE mode for short burst data transmissions, such as for some other applications in which power conservation may be desirable and/or a relatively lower data rate may be acceptable. Additionally, or alternatively, in some aspects, the central device 102 may operate according to one or more other radio modes, such as proprietary radio mode(s). Examples of other radio modes may include high speed radio modes, low energy radio modes, and/or isochronous radio modes, among other examples.

In some aspects, as described in more detail elsewhere herein, an assisting wireless device (e.g., among peripheral devices 104, 106, 108, 110, 112, and 114) may track a first retransmission metric that is based on a number of retransmitted packets that the assisting wireless device received from a source device, such as the central device 102. The assisting wireless device may receive, from a sink wireless device (e.g., among peripheral devices 104, 106, 108, 110, 112, and 114), an acknowledgement assistance request indicating a second retransmission metric for the sink wireless device. The assisting wireless device may transmit, to the sink wireless device, a response to the acknowledgement assistance request based on respective values of the first retransmission metric and the second retransmission metric. Additionally, or alternatively, the assisting wireless device may perform one or more other operations described herein.

In some aspects, as described in more detail elsewhere herein, a sink wireless device (e.g., among peripheral devices 104, 106, 108, 110, 112, and 114) may track a first retransmission metric that is based on a number of retransmitted packets that the sink wireless device received from a source device, such as the central device 102. The sink wireless device may transmit, to an assisting wireless device (e.g., among peripheral devices 104, 106, 108, 110, 112, and 114), an acknowledgement assistance request indicating the first retransmission metric tracked by the sink wireless device. The sink wireless device may receive, from the assisting wireless device, a response to the acknowledgement assistance request based on respective values of the first retransmission metric tracked by the sink wireless device and a second retransmission metric tracked by the assisting wireless device. Additionally, or alternatively, the sink wireless device may perform one or more other operations described herein.

As indicated above, FIG. 1 is provided as an example. Other examples may differ from what is described with regard to FIG. 1.

Figure 2:
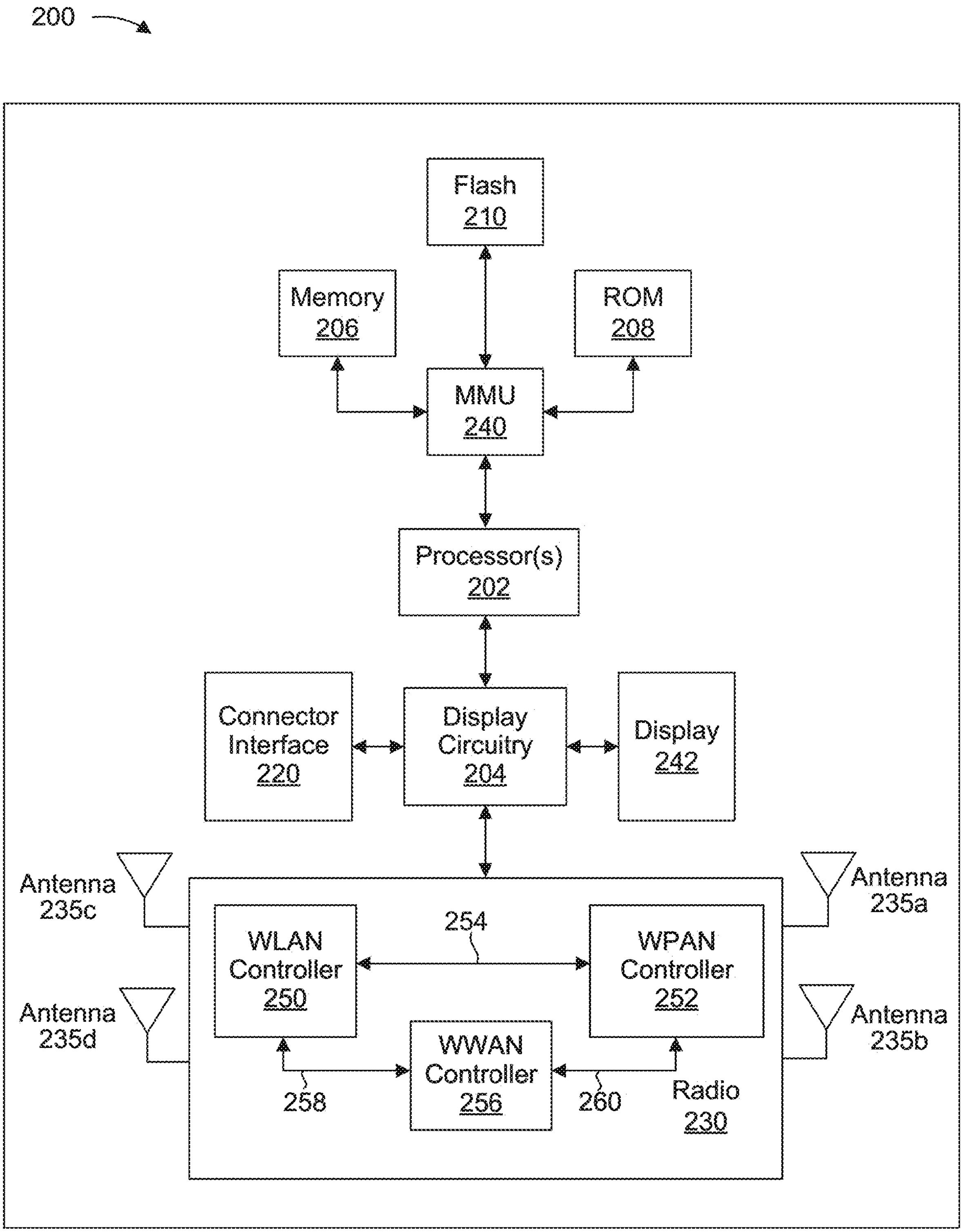
FIG. 2 is a diagram illustrating an example of a wireless communication device, in accordance with the present disclosure.

FIG. 2 is a diagram illustrating an example of a wireless communication device 200, in accordance with the present disclosure. In some aspects, the wireless communication device 200 may be an example of the central device 102 illustrated in FIG. 1. Additionally, or alternatively, the wireless communication device 200 may be an example of one or more of the peripheral devices 104, 106, 108, 110, 112, or 114 illustrated in FIG. 1. In some aspects, the wireless communication device 200 may be a Bluetooth-enabled device (such as a BLE device).

As shown in FIG. 2, the wireless communication device 200 may include a processing element, such as processor(s) 202, which may execute program instructions for the wireless communication device 200. The wireless communication device 200 may also include a display 242 that can perform graphics processing and present information to a user. The processor(s) 202 may also be coupled to a memory management unit (MMU) 240, which may be configured to receive addresses from the processor(s) 202 and translate the addresses to address locations in memory such as memory 206, ROM 208, or flash memory 210 and/or to address locations in other circuits or devices, such as display circuitry 204, radio 230, connector interface 220, and/or display 242. The MMU 240 may also be configured to perform memory protection and page table translation or set up. In some aspects, the MMU 240 may be included as a portion of the processor(s) 202.

The processor(s) 202 may be coupled to other circuits of the wireless communication device 200. For example, the wireless communication device 200 may include various memory types, a connector interface 220 through which the wireless communication device 200 can communicate with a computer system, and wireless communication subsystems that can transmit data to, and receive data from, other devices based on one or more wireless communication standards or protocols. For example, in some aspects, the wireless communication subsystems may include (but are not limited to) a wireless local-area network (WLAN) subsystem, a WPAN subsystem, and/or a cellular subsystem (such as a Long-Term Evolution (LTE) or New Radio (NR) subsystem). The wireless communication device 200 may include multiple antennas 235*a*, 235*b*, 235*c*, and/or 235*d* for performing wireless communication with, for example, wireless communication devices in a WPAN. In some aspects, the WPAN may be an extended PAN (XPAN).

The wireless communication device 200 may be configured to implement part or all of the techniques described herein by executing program instructions stored on a memory medium (such as a non-transitory computer-readable memory medium) and/or through hardware or firmware operation. In other embodiments, the techniques described herein may be at least partially implemented by a programmable hardware element, such as an FPGA, and/or an application specific integrated circuit (ASIC).

In some aspects, the radio 230 may include separate controllers configured to control communications for various respective radio access technology (RAT) protocols. For example, as shown in FIG. 2, radio 230 may include a WLAN controller 250 that manages WLAN communications, a WPAN controller 252 that manages Bluetooth, BLE, and/or other suitable WPAN communications, and a wireless wide area network (WWAN) controller 256 that manages WWAN communications. In some aspects, the wireless communication device 200 may store and execute a WLAN software driver for controlling WLAN operations performed by the WLAN controller 250, a WPAN software driver for controlling WPAN operations performed by the WPAN controller 252, and/or a WWAN software driver for controlling WWAN operations performed by the WWAN controller 256.

In some aspects, a first coexistence interface 254 (such as a wired interface) may be used for sending information between the WLAN controller 250 and the WPAN controller 252. Additionally, or alternatively, in some aspects, a second coexistence interface 258 may be used for sending information between the WLAN controller 250 and the WWAN controller 256. Additionally, or alternatively, in some aspects, a third coexistence interface 260 may be used for sending information between the WPAN controller 252 and the WWAN controller 256.

In some aspects, one or more of the WLAN controller 250, the WPAN controller 252, and/or the WWAN controller 256 may be implemented as hardware, software, firmware, or any suitable combination thereof.

In some aspects, the WLAN controller 250 may be configured to communicate with a second device in a WPAN using a WLAN link using one or more, some, or all of the antennas 235*a*, 235*b*, 235*c*, and 235*d*. In other configurations, the WPAN controller 252 may be configured to communicate with at least one second device in a WPAN using one or more, some, or all of the antennas 235*a*, 235*b*, 235*c*, and 235*d*. In other configurations, the WWAN controller 256 may be configured to communicate with a second device in a WPAN using one or more, some, or all of the antennas 235*a*, 235*b*, 235*c*, and 235*d*. The WLAN controller 250, the WPAN controller 252, and/or the WWAN controller 256 may be configured to adjust a wakeup time interval and a shutdown time for the wireless communication device 200.

A short-range wireless communications protocol, such as BT, BLE, and/or BR/EDR, may include and/or may use one or more other communications protocols, for example, to establish and maintain communications links. Referring also to FIG. 1, the wireless communication device 200 may establish a communications link 116 with one or more peripheral devices, such as a wireless headset 112, according to at least one communications protocol for short-range wireless communications. In some aspects, the communications link 116 may include a communications link that adheres to a protocol included and/or for use with BT, BLE, BR/EDR, or the like. In one aspect, the communications link 116 may include an asynchronous connection-oriented logical (ACL) transport, sometimes referred to as an ACL link. When operating as an ACL link, the communications link 116 may allow the central device 102 (e.g., a source device) to connect or "pair" with a peripheral device, such as the headset 112. The connection is asynchronous in that the two devices may not need to synchronize, timewise, data communications between each other to permit communication of data packets via the communications link 116.

In some aspects, a logical link control and adaptation protocol (L2CAP) may be used within a BT protocol stack (not shown in FIG. 2 for simplicity). An L2CAP connection may be established after an ACL link has been established. Reference to L2CAP in the present disclosure may be further applicable to enhanced L2CAP (EL2CAP), which may be an enhanced version of the L2CAP protocol that enables multiplexing of multiple logical data channels via a single radio connection.

In some aspects, the communications link 116 may include an advanced audio distribution profile (A2DP) link. For example, an A2DP link may provide a point-to-point link between a source device, such as the central device 102, and a sink device, such as the headset 112. With an A2DP link, data packets including audio may be transmitted over an ACL channel, and other information (e.g., for controlling the audio stream) may be transmitted over a separate control channel. The data packets may occur non-periodically.

In some aspects, the communications link 116 may support synchronous logical transport mechanisms between a source device (such as the central device 102) and a peripheral device (such as the headset 112). For example, the communications link 116 may include a synchronous connection-oriented (SCO) link that provides a symmetric point-to-point link between the source device and the peripheral device using time slots reserved for BT communications. In some aspects, an SCO link may not support retransmission of data packets, which may be unsatisfactory in audio streaming and/or voice call use cases in which a dropped audio or voice packet may reduce the quality of the user experience.

In some aspects, the communications link 116 may include an extended SCO (eSCO) link. An eSCO link may provide a symmetric or asymmetric point-to-point link between a source device and a peripheral device using time slots reserved for BT communications, and may also provide for a retransmission window following the reserved time slots. Because retransmissions may be facilitated using the retransmission window, an eSCO link may be suitable for audio streaming and/or voice call use cases because a dropped audio or voice packet may be retransmitted, and therefore the probability of successfully receiving a data packet may be increased.

In some aspects, the communications link 116 shown in FIG. 1 may include an ISO link. When operating as an ISO link, the communications link 116 may combine some features of both synchronous and asynchronous links. For example, a stream on an ISO link may begin with a start packet, and then data packets may be asynchronously transmitted. On an ISO link, the number of retransmission attempts by a transmitting device may be limited. Thus, if a receiving device is unable to decode a data packet within the limited number of retransmission attempts, then the data packet may be dropped, and the receiving device may continue to receive the stream without data from the dropped data packet.

In some aspects, the wireless device includes means for receiving a data packet on an ISO link; and/or means for transmitting an LE packet with feedback for the data packet. In some aspects, the means for the first peripheral device to perform operations described herein may include, for example, one or more of a WPAN controller 252, memory 206, antenna 235, processor 202, and/or MMU 240.

In some aspects, the wireless device includes means for transmitting a first set of ISO data packets on an ISO link; means for receiving a second set of ISO data packets on the ISO link; means for receiving a first set of feedback packets for the first set of ISO data packets; means for transmitting a second set of feedback packets for the second set of ISO data packet; and/or means for transmitting an LE packet earlier than an LE event prescheduled for transmitting the LE packet.

As indicated above, FIG. 2 is provided as an example. Other examples may differ from what is described with regard to FIG. 2.

Figure 3:
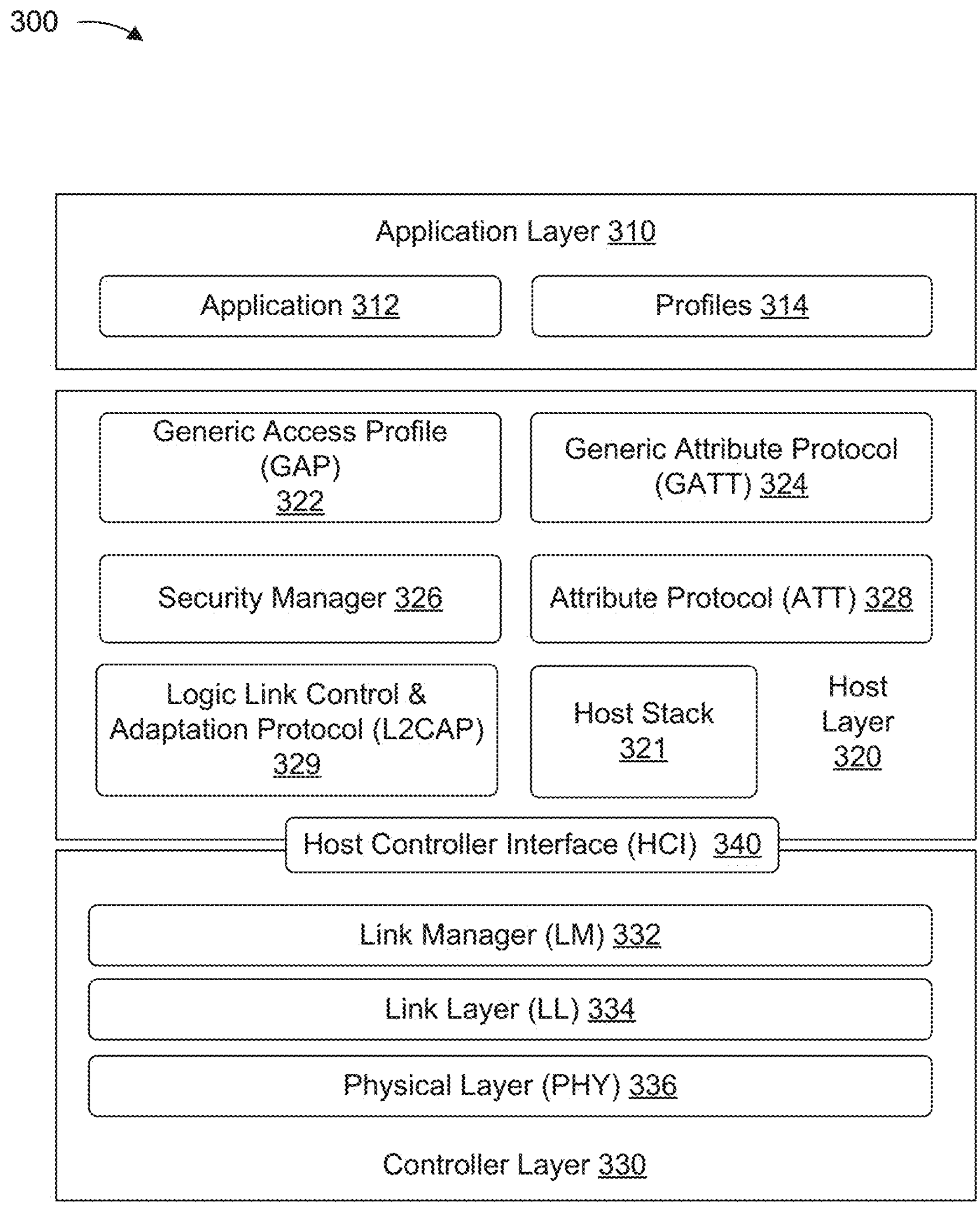
FIG. 3 is a diagram illustrating an example of a protocol stack, in accordance with the present disclosure.

FIG. 3 is a diagram illustrating an example 300 of a protocol stack (e.g., a WPAN and/or a Bluetooth protocol stack), in accordance with the present disclosure. In some aspects, the protocol stack 300 may be implemented in a wireless communication device (such as the central device 102 or one or more of the peripheral devices 104, 106, 108, 110, 112, or 114 of FIG. 1). For example, the protocol stack 300 may be implemented by one or more of processor(s) 202, memory 206, flash memory 210, ROM 208, the radio 230, and/or the WPAN controller 252 illustrated in FIG. 2. In some aspects, the protocol stack 300 may be organized into three layers that include an application layer 310, a host layer 320, and a controller layer 330.

In some aspects, the application layer 310 may be a user application layer that interfaces with the other blocks and/or layers of the protocol stack 300. In some aspects, the application layer 310 may include one or more applications 312 and one or more Bluetooth profiles 314 that allow the one or more applications 312 to use Bluetooth and/or BLE communications. The host layer 320 may include the upper layers of the protocol stack 300, and may communicate with a controller (such as the WPAN controller 252 of FIG. 2) in a wireless communication device using a host controller interface (HCI) 340. In some aspects, the host layer 320 may include a host stack 321 that can be used for application layer interface management to allow an application 312 to access WPAN communications.

The controller layer 330 may include the lower layers of the protocol stack 300. In some aspects, the controller layer 330 may be used for hardware interface management, link establishment, and link management. As shown in FIG. 3, the controller layer 330 may include a link manager (LM) 332, a link layer 334, and a physical (PHY) layer 336. The PHY layer 336 may include, for example, a radio and/or a baseband processor. In some aspects, the PHY layer 336 may define a mechanism for transmitting a bit stream over a physical link or channel that connects WPAN devices. The bit stream may be grouped into code words or symbols, and may be converted to a data packet that is transmitted over a wireless transmission medium. The PHY layer 336 may provide an electrical, mechanical, and/or procedural interface to the wireless transmission medium. The PHY layer 336 may be responsible for modulation and demodulation of data into radio frequency (RF) signals for transmission over the air. The PHY layer 336 may describe the physical characteristics of a transmitter/receiver (or transceiver) included in a wireless communication device. The physical characteristics may include modulation characteristics, an RF tolerance, and/or a sensitivity level, among other examples.

In some aspects, the link layer 334 is responsible for low-level communication over the PHY layer 336. The link layer 334 may manage the sequence and timing for transmitting and receiving data packets, and using an LL protocol, communicates with other devices regarding connection parameters and data flow control. The link layer 334 also provides gatekeeping functionality to limit exposure and data exchange with other devices. If filtering is configured, the link layer 334 maintains a list of allowed devices and may ignore all requests for data exchange from devices not on the list of allowed devices. The link layer 334 may also reduce power consumption. In some aspects, the link layer 334 may include a proprietary LL that may be used to discover peer devices and establish a secure communication channel with the peer devices. In some aspects, the link layer 334 may be responsible for transporting data packets between devices in a WPAN. Each data packet may include an access address, which specifies the type of logical transport used to carry the data packet. Logical transports may exist between a master device and slave devices. Additionally, some logical transports may carry multiple logical links.

The link manager 332 may be responsible for establishing and configuring links and managing power-change requests, among other tasks. Each type of logical link, such as ACL links, A2DP links, SCO links, eSCO links, ISO links, or the like, may be associated with a specific packet type. For example, an SCO link may provide reserved channel bandwidth for communication between a central device and a peripheral device, and may support regular, periodic exchange of data packets with no retransmissions. An eSCO link may provide reserved channel bandwidth for communication between a source device and a peripheral device, and support regular, periodic exchange of data packets with retransmissions. An ACL link may exist between a source device and a peripheral device from the beginning of establishment of a connection between the source device and the peripheral device, and the data packets for ACL links may include encoding information in addition to a payload.

The link manager 332 may communicate with the host layer 320 using the HCI 340. In some aspects, the link manager 332 may translate commands associated with the HCI 340 into controller-level operations, such as baseband-level operations. The HCI 340 may act as a boundary between the lower layers (such as between the controller layer 330, the host layer 320, and the application layer 310). The BT specification may define a standard HCI to support BT systems that are implemented across two separate processors. For example, a BT system on a computer may use a processor of the BT system to implement the lower layers of the protocol stack 300, such as the PHY layer 336, the link layer 334, and/or the link manager 332, and may use a processor of a BT component to implement the other layers of the protocol stack 300, such as the host layer 320 and the application layer 310.

In FIG. 3, the host layer 320 is shown to include a generic access profile (GAP) 322, a generic attribute protocol (GATT) 324, a security manager (SM) 326, an attribute protocol (ATT) 328, and an L2CAP layer 329. The GAP 322 may provide an interface for an application 312 to initiate, establish, and manage connections with other WPAN (e.g., BT or BLE) devices. The GATT 324 may provide a service framework using the attribute protocol for discovering services, and for reading and writing characteristic values on a peer device. The GATT 324 may interface with the application 312, for example, through a profile which may define a collection of attributes and any permissions needed for the attributes to be used in BT or BLE communications.

The security manager 326 may be responsible for device pairing and key distribution. A security manager protocol implemented by the security manager 326 may define how communications with the security manager of a counterpart BLE device are performed. The security manager 326 provides additional cryptographic functions that may be used by other components of the protocol stack 300. The architecture of the security manager 326 used in WPAN communications is designed to minimize recourse requirements for peripheral devices by shifting work to a presumably more powerful central device. BLE uses a pairing mechanism for key distribution. The security manager 326 provides a mechanism to encrypt the data and a mechanism to provide data authentication.

The ATT 328 includes a client/server protocol based on attributes associated with a BLE device configured for a particular purpose. Examples may include monitoring heart rate, temperature, broadcasting advertisements, or the like. The attributes may be discovered, read, and written by peer devices. The set of operations which are executed over the ATT 328 may include error handling, server configuration, find information, read operations, write operations, and/or queued writes. The ATT 328 may form the basis of data exchange between BT and BLE devices.

The L2CAP layer 329 may be implemented above the HCI 340, and may communicate with the controller layer 330 through the HCI 340. The L2CAP layer 329 may be responsible for establishing connections across one or more existing logical links and for requesting additional links if none exist. The L2CAP layer 329 may also implement multiplexing between different higher-layer protocols, for example, to allow different applications to use a single link, such as a logical link, including an ACL link. In some implementations, the L2CAP layer 329 may encapsulate multiple protocols from the upper layers into a data packet format (and vice versa). The L2CAP layer 329 may also break packets with a large data payload from the upper layers into multiple packets with the data payload segmented into smaller size data payloads that fit into a maximum payload size (for example, twenty-seven (27) bytes) on the transmit side.

In some standards and protocols, such as BLE and/or BR/EDR, the central device 102 may detect errors in a packet and/or a dropped/missed/not received packet through the use of cyclic redundancy check (CRC) validation and through the use of message integrity code (MIC) validation. MIC validation may be used when a packet is encrypted. For example, failure of CRC validation may indicate one or more errors in a received packet, and failure of MIC validation may indicate that another packet has not been received (although failure of CRC validation may also indicate that another packet has not been received, and/or failure of MIC validation may also indicate one or more errors in a received packet).

CRC validation and MIC validation may be based on generating CRC values and MICs, respectively, based on received packets and respectively comparing those generated CRC values and MICs to CRC values and MICs included in the received packets. Specifically, a receiving device, such as the headset 112, that receives a packet may first generate a CRC value or a CRC checksum based on the received packet, such as based on a payload and, if applicable, an MIC included in the received packet. The receiving device may compare the generated CRC value with a CRC value included in the received packet. If the generated CRC value matches the CRC value included in the received packet, then the received packet may be validated for CRC. The CRC-validated received packet may then be decrypted. However, if the generated CRC value does not match the CRC value included in the received packet, then the receiving device may determine that the received packet fails CRC validation. If the receiving device determines that the received packet fails CRC validation, then the received packet may include errors and/or may be corrupted. In one configuration, the receiving device may discard the received packet that fails CRC validation. Alternatively, in another configuration, the receiving device may attempt to recover the received packet, for example, using one or more error correction techniques.

If the received packet is encrypted and passes CRC validation, then the receiving device may decrypt the received packet to obtain a decrypted payload and a decrypted MIC. For MIC validation, the receiving device may generate an MIC based on the decrypted payload and compare the generated MIC with the MIC obtained from the decrypted received packet. If the generated MIC matches the decrypted MIC, then the receiving device may determine that the received packet is successfully decrypted. When the received packet is successfully decrypted, the decoded and decrypted payload of the received packet may be provided to another layer of the receiving device, such as a coder-decoder (codec) of the receiving device that may cause the payload data of the received packet to be output by the receiving device, for example, as audio through speakers of the headset 112.

If the generated MIC does not match the decrypted MIC of the received packet, then the receiving device may determine that the received packet is unsuccessfully decrypted. When the received packet is unsuccessfully decrypted, then a different packet may have been missed or the received packet may be erroneous or otherwise corrupted. In one configuration, the receiving device may discard the received packet that fails MIC validation. Alternatively, in another configuration, the receiving device may attempt to recover the received packet.

As indicated above, FIG. 3 is provided as an example. Other examples may differ from what is described with regard to FIG. 3.

Figure 4:
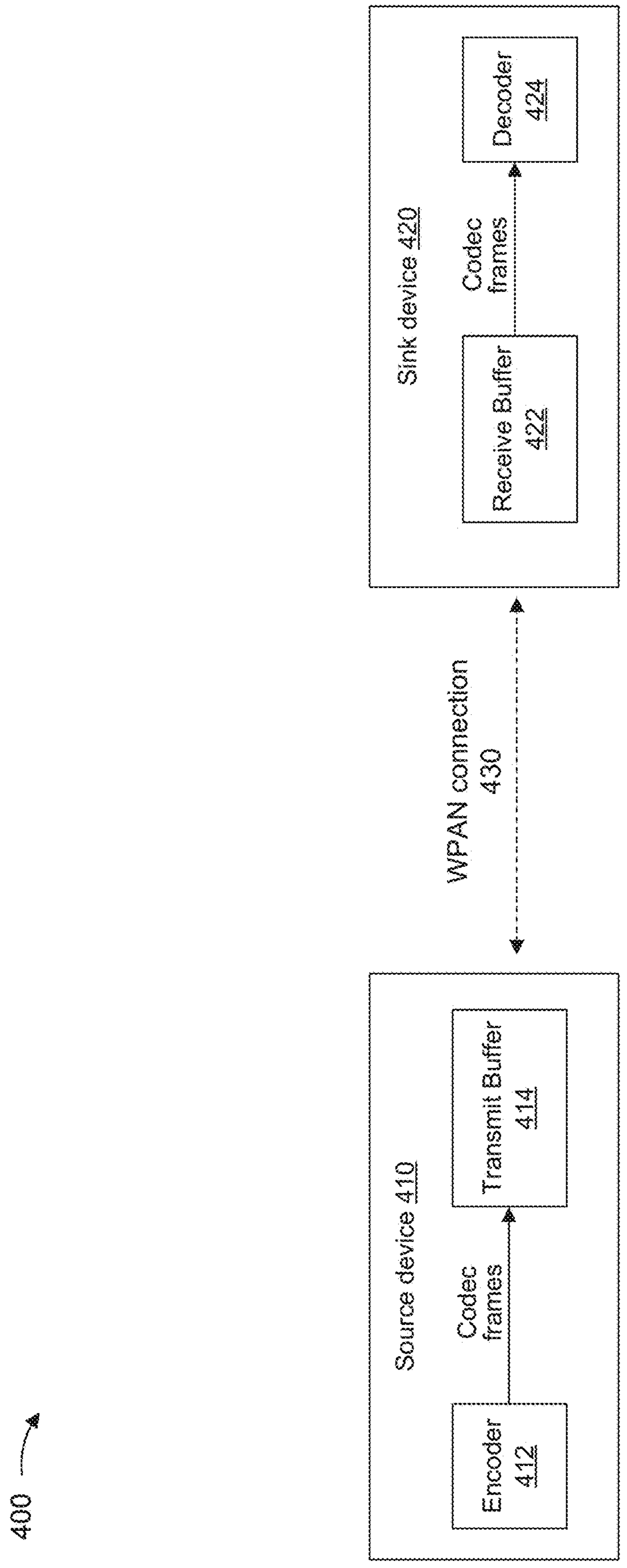
FIG. 4 is a diagram illustrating an example transmission of a data packet from a wireless communication device to a peripheral device over a WPAN connection, in accordance with the present disclosure.

FIG. 4 is a diagram illustrating an example transmission 400 of a data packet from a source device 410 to a sink device 420 over a WPAN connection 430, according to the present disclosure. In some aspects, the source device 410 may be one example of the central device 102 in FIG. 1 and/or the wireless communication device 200 in FIG. 2, and the sink device 420 may be an example of one or more of the peripheral devices 104, 106, 108, 110, 112 or 114 in FIG. 1. In some aspects, the sink device 420 may be a wireless earbud, a pair of wireless earbuds, a wireless portable speaker, or another suitable device. The WPAN connection 430 may be any suitable Bluetooth or BLE connection or link. In some instances, the WPAN connection 430 may be one or more of an ACL link, an L2CAP link, an A2DP link, an SCO link, or an ISO link.

As shown in FIG. 4, the source device 410 may include an encoder 412 and a transmit buffer 414. The encoder 412 may be configured to encode data, such as audio or video data, using a specified bitrate. The transmit buffer 414 may be configured to queue data packets that are to be transmitted over the WPAN connection 430 to the sink device 420. In some implementations, the data packets to be transmitted over the WPAN connection 430 may have a predefined size, for example, based on the type of WPAN connection 430 and/or channel conditions associated with the WPAN connection 430. In some aspects, data encoded by the encoder 412 may be packetized into a data packet of a predefined size. The source device 410 may de-queue data packets from the transmit buffer 414 and transmit the data packets to the sink device 420 over the WPAN connection 430.

As further shown in FIG. 4, the sink device 420 may include a receive buffer 422 and a decoder 424. Data packets that the sink device 420 receives over the WPAN connection 430 may be queued or otherwise stored in the receive buffer 422. The data packets may be output from the receive buffer 422 and forwarded to the decoder 424. In some aspects, the decoder 424 may decode data (such as audio and/or video data) carried in the payloads of the queued data packets, and forward the decoded data to upper layers of the protocol stack for processing and playback to a user. In some implementations, the encoder 412 may encode a first encoder/decoder (codec) frame using a first bitrate and forward the first codec frame to the transmit buffer 414 to be packetized for transmission to the sink device 420 over the WPAN connection 430. The sink device 420 may queue the received data packet in the receive buffer 422 and may forward the first portion of the first codec frame to the decoder 424 for decoding.

As indicated above, FIG. 4 is provided as an example. Other examples may differ from what is described with regard to FIG. 4.

Figure 5:
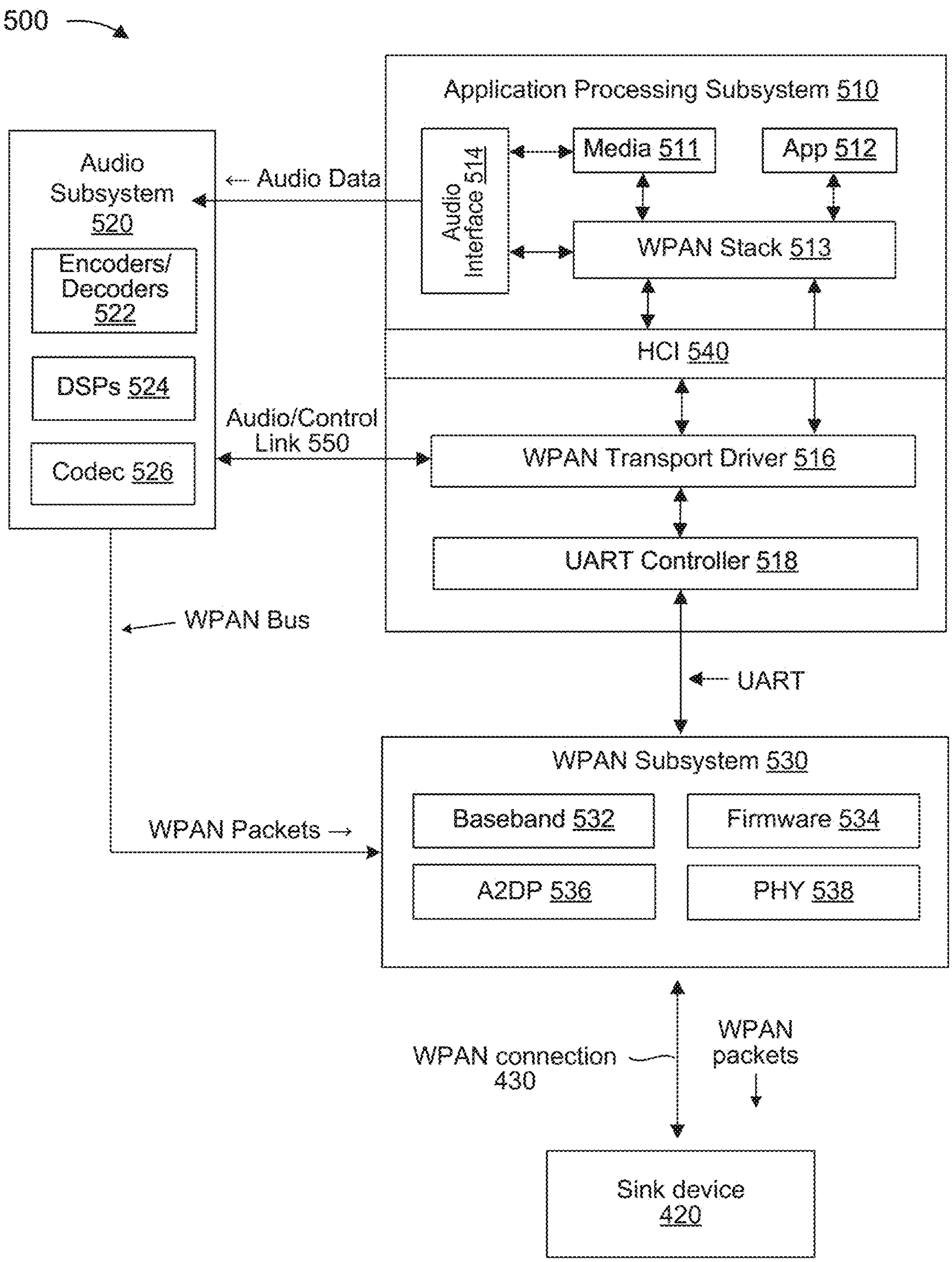
FIG. 5 is a diagram illustrating an example of a wireless communication device, in accordance with the present disclosure.

FIG. 5 is a diagram illustrating an example 500 of a wireless communication device 500, according to the present disclosure. In some aspects, the wireless communication device 500 may be an example of the central device 102 in FIG. 1, the wireless communication device 200 in FIG. 2, or the source device 410 in FIG. 4. In example 500, the wireless communication device 500 is depicted as having an established WPAN connection 430 (e.g., a Bluetooth communication connection) with the sink device 420 in FIG. 4.

The wireless communication device 500 may include an application processing subsystem 510, an audio subsystem 520, a WPAN subsystem 530, and an HCI 540. The application processing subsystem 510, which may correspond to at least some portions of the application layer 310 and the host layer 320 of the protocol stack 300 of FIG. 3, is shown to include a media player 511, an application layer 512, a WPAN stack 513, and an audio interface 514. The media player 511 can be any suitable device or component capable of generating or receiving multimedia content including, for example, real-time audio streams, real-time video streams, real-time gaming streams, and/or latency-sensitive traffic, among other examples. The application layer 512, which may be one implementation of the application layer 310 of FIG. 3, includes at least one Bluetooth profile that defines the collection of attributes and associated permissions to be used in Bluetooth or BLE communications. In some aspects, the application layer 512 may include processing resources including, for example, the memory 206, the ROM 208, and/or the flash memory 210 of FIG. 2. The WPAN stack 513 may be one implementation of the protocol stack 300 of FIG. 3.

In some aspects, as shown in FIG. 5, the application processing subsystem 510 may include a WPAN transport driver 516, which may include a split audio and packetization module (not shown for simplicity) that can packetize data (such as audio and/or video data) into Bluetooth frames that can be transmitted to the sink device 420 using a Bluetooth and/or BLE protocol. In some aspects, the WPAN transport driver 516 may be connected to the audio subsystem 520 via an audio and control link 550. In some aspects, the audio and control link 550 may be used to send encoded audio/video data and control signals between the WPAN transport driver 516 and audio/video DSPs within the audio subsystem 520. The WPAN transport driver 516 is also connected to a universal asynchronous receiver-transmitter (UART) controller 518 that provides controls for transmission of information via the WPAN connection 430.

The audio subsystem 520 may include encoders/decoders 522, one or more DSPs 524, and one or more codecs 526. The encoders/decoders 522 may be used to sample audio/video data extracted from one or more packets received from another wireless communication device. The extracted audio/video data may be processed in the application processing subsystem 510 based at least in part on the Bluetooth profile. In some implementations, the encoders/decoders 522 may partition the sampled audio/video data into payloads that can be embedded within one or more Bluetooth packets for transmission to the sink device 420 over the WPAN connection 430. In some instances, the DSPs 524 and/or the codecs 526 may employ one or more encoding or decoding algorithms in conjunction with sampling the audio data.

The WPAN subsystem 530 may include a baseband component 532 (e.g., a Bluetooth baseband component), a firmware component 534, an A2DP component 536, and a PHY component 538. The baseband component 532 and the firmware component 534 may be used to generate baseband signals for constructing and deconstructing data frames based on the Bluetooth or BLE protocol. The baseband component 532 and the firmware component 534 may also be used to generate carrier signals for up-converting baseband signals during data transmissions and for down-converting received data signals to baseband. The A2DP component 536 may be used to control or manage an A2DP link between the wireless communication device 500 and the sink device 420. Specifically, when the WPAN subsystem 530 is in a receive mode, the PHY component 538 can be used to receive, demodulate, and down-convert data packets received over the WPAN connection 430, and to forward the data packets to the application processing subsystem 510. When the WPAN subsystem 530 is in a transmit mode, the PHY component 538 can be used to encapsulate data provided from the upper layers into one or more Bluetooth frames or packets for transmission to the sink device 420 over the WPAN connection 430.

Communications may be target wake time (TWT)-based with synchronized end-to-end (E2E) timing. TWT involves the use of a schedule for waking up to communicate and powering down to conserve power.

As indicated above, FIG. 5 is provided as an example. Other examples may differ from what is described with regard to FIG. 5.

Figure 6:
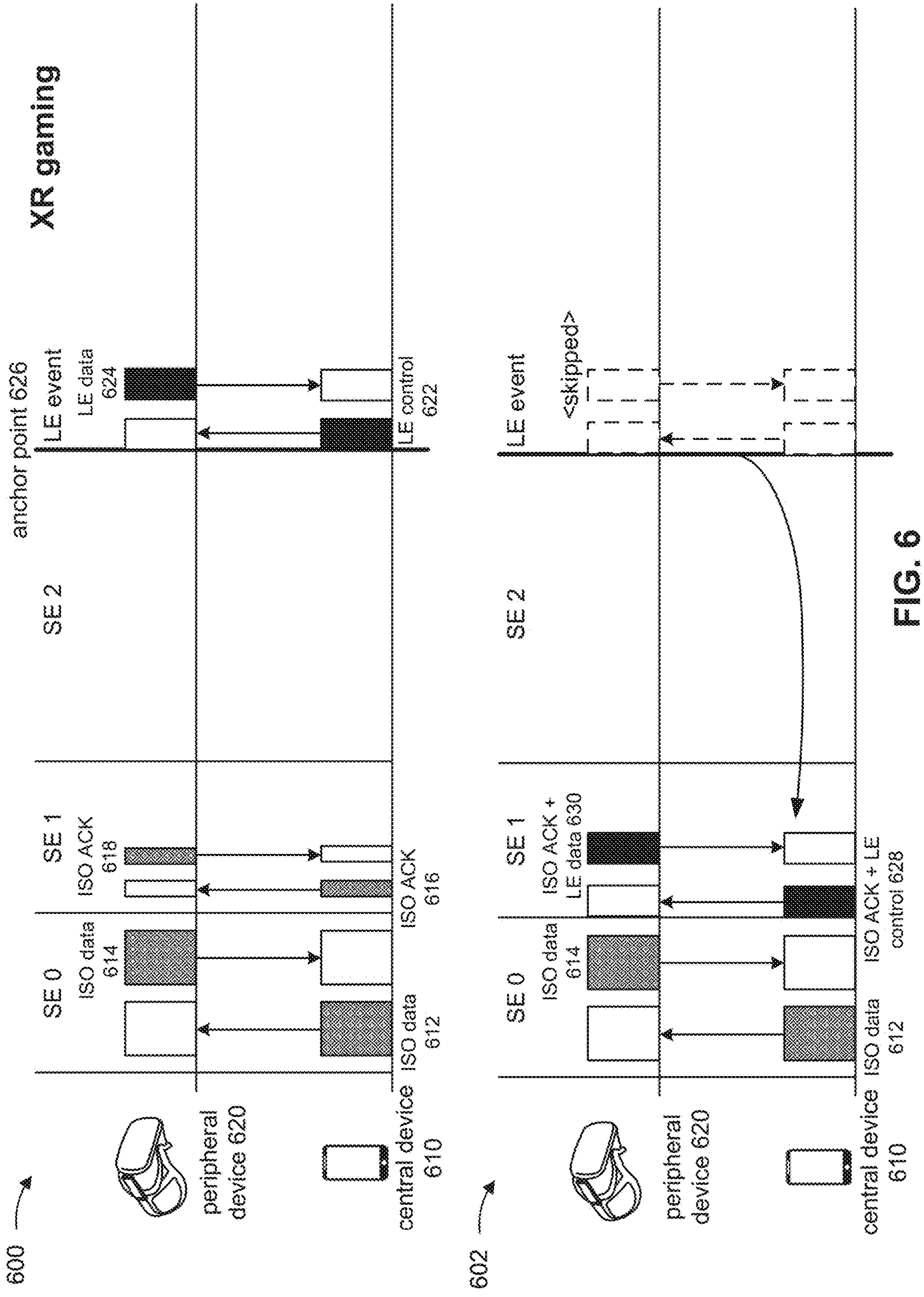
FIG. 6 is a diagram illustrating examples of using isochronous (ISO) links, in accordance with the present disclosure.

FIG. 6 is a diagram illustrating examples 600 and 602 of using ISO links, in accordance with the present disclosure.

A central device 610 (e.g., a handset, a smartphone, a gaming console) may support a peripheral link with a peripheral device 620 (e.g., earbud, an XR headset, XR glass, wearable device, portable speaker), such as a BR/EDR Bluetooth audio link (BREDR), a BLE link, an A2DP link, or a proprietary link. The central device 610 may stream audio or video on LE ISO links. As shown by example 600, the central device 610 may transmit ISO data 612 (e.g., audio data, video data) in an ISO data packet on an ISO link. The peripheral device 620 may transmit ISO data 614 (e.g., controller input) in an ISO data packet to the central device 610. The central device 610 may transmit feedback (e.g., ISO ACK 616) for the ISO data 614. The peripheral device 620 may transmit feedback (e.g., ISO ACK 618) for the ISO data packet for the ISO data 612. The number of subevents (NSE) may be 3, and the BN may be 1.

LE packets may include sensor data from the peripheral device or control information from the central device. The central device 610 may transmit LE control information (e.g., LE control 622) in an LE packet to the peripheral device 620. The peripheral device 620 may collect sensor data (e.g., orientation data, proximity data) and transmit the sensor data (e.g., LE data 624) with any other LE data in an LE packet to the central device 610. LE packets may be prescheduled to be transmitted during an LE event. An anchor point 626 may mark a beginning of the LE event. An LE event may also be referred to as an asynchronous connection link (ACL).

In use cases such as spatial audio or XR, LE packets are expected to be delivered on time for the best user experience. Sensor data on an earbud, XR headset, or XR glass may be sampled at a high rate to create accurate outputs for the user with low latency. Accordingly, applications may request aggressive LE parameters with an ISO link. For example, there may be a 20 ms LE interval to deliver sensor data from the peripheral device 620 or to deliver control messages from the central device 610, along with a 7.5 ms or a 10 ms ISO interval. These interval times create several problems. The central device 610 may not have sufficient contiguous time for WiFi activity by the central device 610 and/or the peripheral device 620. Switching back and forth between WiFi and other signaling when multiple links are involved can cause a scheduling problem as the back and forth can fragment the bandwidth used for WiFi. With fragmented or insufficient bandwidth, latency may increase and signaling resources may not be used efficiently. Furthermore, there may not be enough bandwidth for other operations, in addition to the streaming and sensor exchange, such as proximity applications that constantly advertise the state of the peripheral device, linking to another computer, or earbud scanning. The peripheral device 620 may not easily schedule multiple links to support multi-point use cases. One solution is to not schedule an LE link, but this will further increase the latency of LE packets.

According to various aspects described herein, the devices may transmit LE packets earlier than expected, such as with the feedback for the ISO data packets. For example, the LE data or control information may piggyback on an ISO ACK, which may be in an ISO subevent that is earlier than a prescheduled LE event. A prescheduled LE event may not necessarily be explicitly scheduled by the central device, but may include a subevent or time when LE packets are expected according to an LE interval that is larger than an ISO data interval.

Example 602 shows the central device 610 transmitting feedback and LE data together (e.g., ISO ACK and LE control 628). The peripheral device 620 may also transmit feedback and LE data together (e.g., ISO ACK and LE data 630). Example 600 shows that LE packets may be scheduled to be transmitted in subevent 1, just after subevent 0 when the ISO data is exchanged (or the ISO subevent after previous ISO subevents where all ISO data packets are received). In some aspects, the transmitting device may transmit an indication (e.g., bit reserved for future use) that the LE packet is to be transmitted in an ISO subevent that is earlier than an LE event. The anchor point associated with the LE event (when LE packets are to be transmitted) may be moved earlier, to the start of the earlier ISO subevent. There may not be any empty subevents between when ISO data and feedback is exchanged and when LE packets are exchanged. Transmitting the LE packet in the earlier ISO event, rather than in the later LE event, may result in a lower bandwidth requirement and a higher probability of obtaining a larger window of ISO and LE inactivity that can be utilized for other signaling (e.g., WiFi, other links) or applications at the central device 610.

In some scenarios, the devices may use encryption packet counters for encrypting and decrypting LE packets. In some aspects, the devices may adjust an encryption packet counter value to account for a maximum quantity of LE packets that will be transmitted in an ISO interval. This will enable a device to “sneak” in an LE packet in an ISO event with minimal changes at a controller layer of a device.

For example, if two unique ISO data packets (e.g., bit number (BN)=2) can be exchanged in each ISO event, a packet counter may be expected to start with 0 in ISO event 0. After sending two ISO data packets in event 0, in event 1, the packet counter may start from 2. In event 2, packet counter may start from 4. In event 3, the packet counter may start from 6 and so on. However, if a transmitting device transmits an extra LE packet in an ISO event, the existing calculation will not work. The packet counter may be adjusted to account for the maximum possible LE data packets that can be accommodated in each ISO event. If the maximum possible LE packets in an ISO event is 2, then each ISO event may start with a multiple of 4 for the packet counter. Event 0 may start with a packet count of 0. Event 1 may start with a packet count of 4. Event 2 may start with a packet count of 8 and so on. Other multiples may be used.

By transmitting LE packets earlier, a central device may skip scheduling an explicit LE link and spend more time with WiFi operations because of the larger window of LE inactivity. More aggressive LE parameter values may be avoided because the latency of LE packets is reduced. Overall bandwidth requirements for ISO data and LE data/control information may also be reduced.

As indicated above, FIG. 6 is provided as an example. Other examples may differ from what is described with regard to FIG. 6.

Figure 7:
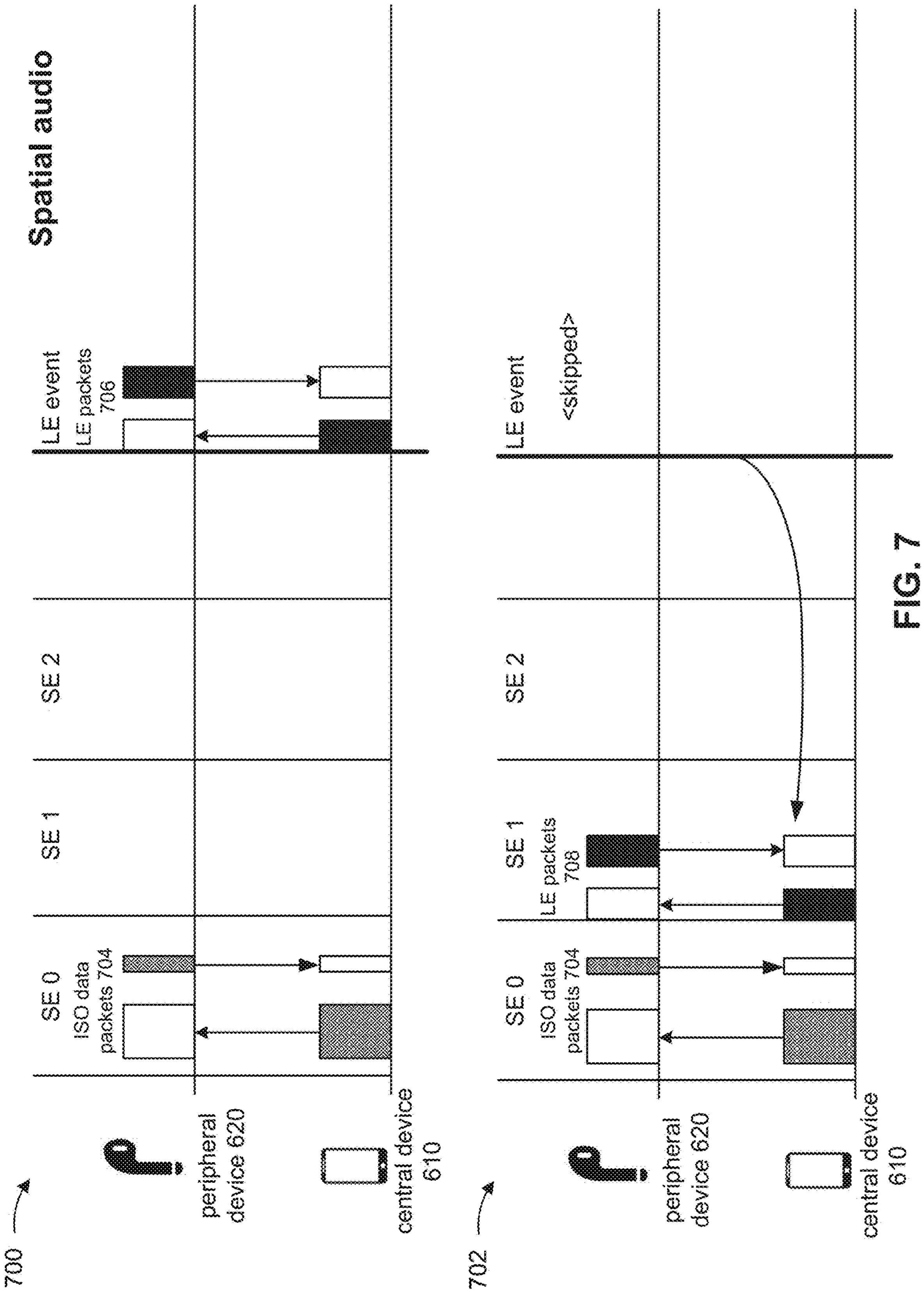
FIG. 7 is a diagram illustrating examples of using ISO links, in accordance with the present disclosure.

FIG. 7 is a diagram illustrating examples 700 and 702 of using ISO links, in accordance with the present disclosure. Example 700 relates to the use case of spatial audio.

Example 700 shows the transmission of ISO data packets 704 in subevent 0 and the transmission of LE packets 706 during an LE event. Example 702 shows the transmission of LE packets 708 in subevent 1, which is earlier than the prescheduled LE event.

As indicated above, FIG. 7 is provided as an example. Other examples may differ from what is described with regard to FIG. 7.

Figure 8:
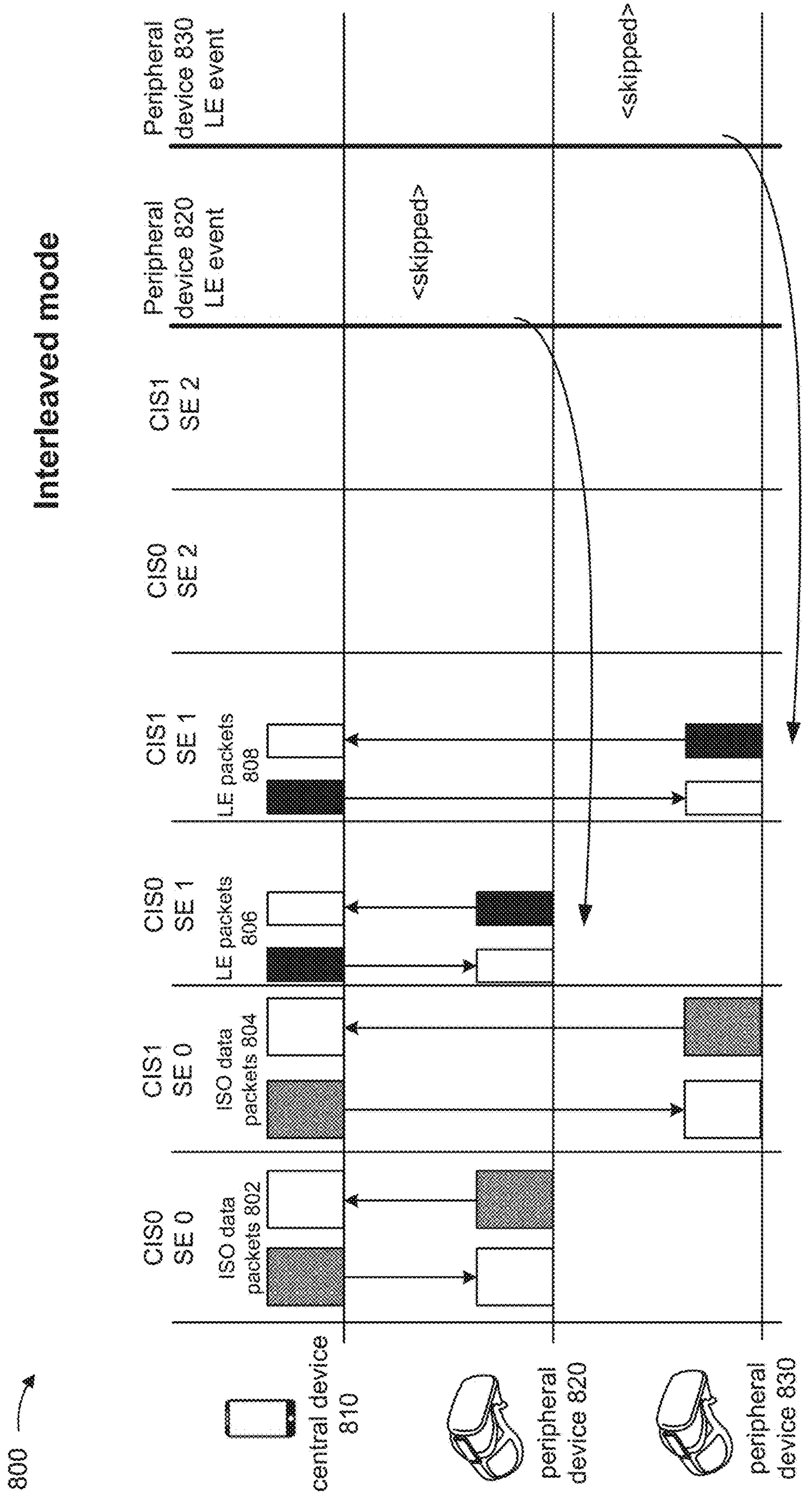
FIG. 8 is a diagram illustrating an example and of interleaved ISO links, in accordance with the present disclosure.

FIG. 8 is a diagram illustrating an example 800 and of interleaved ISO links, in accordance with the present disclosure. Example 800 shows the transmission of ISO data packets in an interleaved mode, such when each earbud of a pair of earbuds receives an audio stream.

The central device 810 (e.g., smartphone) may exchange ISO data packets 802 with peripheral device 820 (e.g., left earbud) in subevent 0 of CIS link 0. The central device 810 may then exchange ISO data packets 804 with peripheral device 830 (e.g., right earbud) in subevent 0 of CIS link 1.

The central device 810 may exchange LE packets 806 with peripheral device 820 in subevent 1 of CIS link 0. The central device 810 may exchange LE packets 808 with peripheral device 830 in subevent 1 of CIS link 1. The LE packets may be exchanged before the prescheduled LE events.

In some aspects, such as for a pair of earbuds, when an earbud has data to transmit on an ISO link, the central device or the primary earbud may schedule the last ISO subevent with just the feedback (e.g., ACK). When the earbud does not have any data to transmit, the device may piggyback the LE packet with ISO data.

As indicated above, FIG. 8 is provided as an example. Other examples may differ from what is described with regard to FIG. 8.

Figure 9:
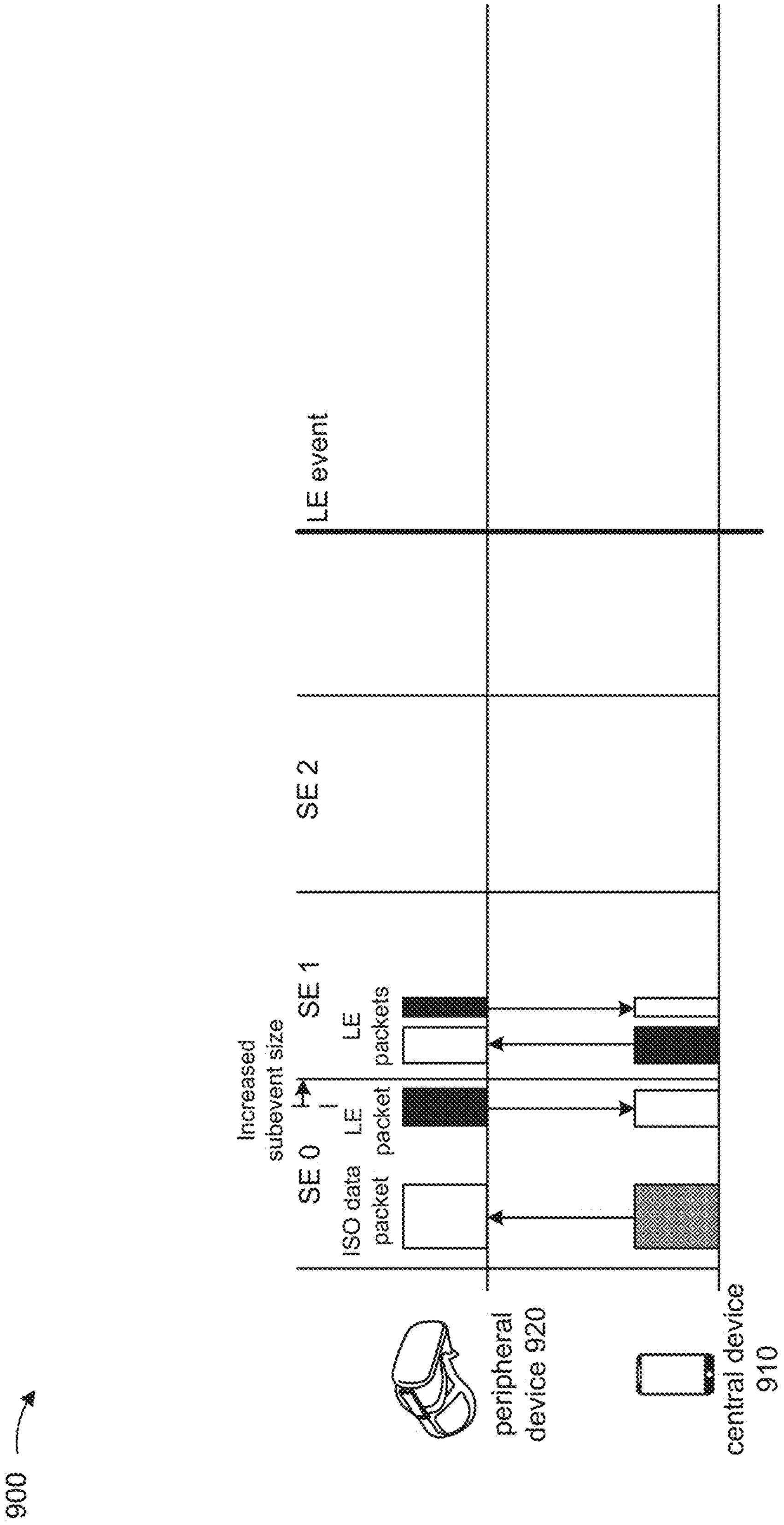
FIG. 9 is a diagram illustrating an example and of using ISO links, in accordance with the present disclosure.

FIG. 9 is a diagram illustrating an example 900 and of using ISO links, in accordance with the present disclosure.

In some aspects, a transmitting device (e.g., central device 910 or peripheral device 920) may use a subevent of increased size to include an ISO data packet and an LE packet in the same ISO subevent to a receiving device (e.g., peripheral device 920 or central device 910). The ISO subevent may no longer be dedicated to ISO data packets. The increased size may be based at least in part on a maximum quantity of LE data packets or a host configured value. The transmitting device may transmit an LE packet if there is no more ISO data to be transmitted. The transmitting device need not wait for an empty ISO subevent to transmit feedback or an LE packet. Example 900 shows an ISO data packet and an LE packet in the same ISO subevent (subevent 0), the transmitting device.

As indicated above, FIG. 9 is provided as an example. Other examples may differ from what is described with regard to FIG. 9.

Figure 10:
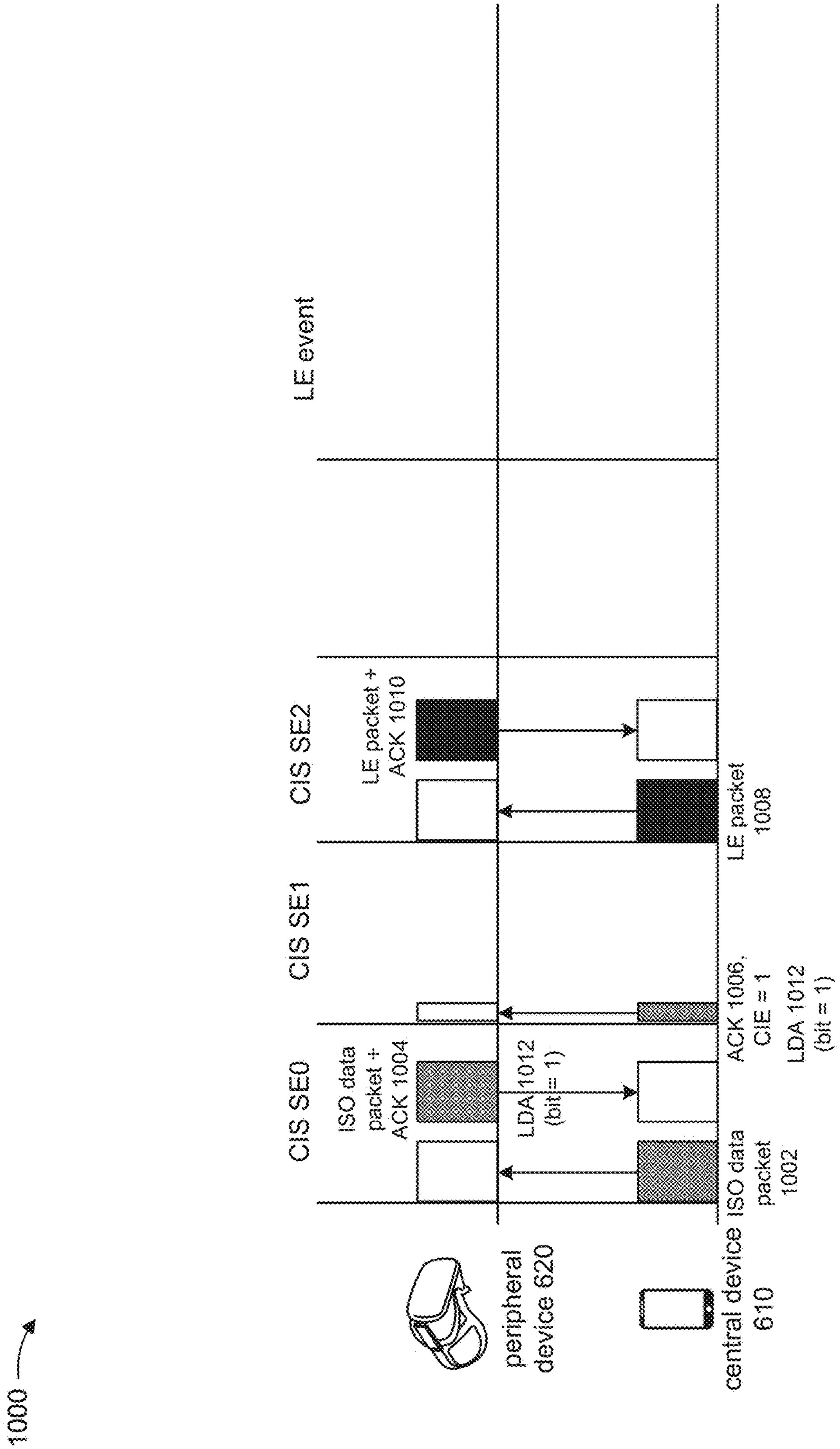
FIG. 10 is a diagram illustrating an example of using ISO links, in accordance with the present disclosure.

FIG. 10 is a diagram illustrating an example 1000 of using ISO links, in accordance with the present disclosure.

Example 1000 shows the central device 610 transmitting an ISO data packet 1002 (as part of a first set of ISO data packets) and the peripheral device transmitting an ISO data packet (as part of a second set of ISO data packets) with an ACK 1004 (as part of a first set of feedback packets). A set of ISO data packets may include one or more ISO data packets. The central device 610 may also transmit an ACK 1006 (as part of a second set of feedback packets). There may be multiple ISO data packets (and feedback) exchanged in one or more ISO subevents. A set of feedback packets may include one or more feedback packets.

In some aspects, a transmitting device may transmit LE packets once all of the ISO data packets scheduled in the ISO subevents have been transferred successfully in both directions. Example 1000 shows the central device 610 may transmit an LE packet 1008, and the peripheral device 620 may transmit an LE packet 1010 with an ACK.

In some aspects, if there is an LE packet to be sent and both the transmitting device and the receiving device support an indication that LE packets are to be transmitted before a prescheduled LE event, then the transmitting device may transmit the indication. The indication may be an LE packet data available (LDA) bit 1012. The transmitting device may transmit the LDA bit 1012 in an extended ISO data packet header. Example 1000 shows that either device may transmit the indication. The devices may transmit LE packets starting in the next available ISO subevent. The anchor point associated with the LE event may be moved earlier, to the start of the next available ISO subevent. The LE packets may be transmitted using regular LE link parameters (commonly used or configured along with ISO data parameters), such as an access address, acknowledgment and flow control parameters (sequence number (SN) and next expected sequence number (NESN) bits), and/or encryption parameters (packet counter).

By transmitting LE packets once all streaming data and feedback has been exchanged, rather than waiting for a prescheduled LE event, the LE packets may be transmitted sooner. This may provide a larger window of inactivity such that the central device may skip scheduling an LE link and spend more time with WiFi operations. Empty subevents between the last of the ISO data feedback and the LE packets may be avoided. Scheduling may be more efficient in an ISO interleaved mode and more aggressive LE parameter values may be avoided because the latency of LE packets is reduced.

As indicated above, FIG. 10 is provided as an example. Other examples may differ from what is described with regard to FIG. 10.

Figure 11:
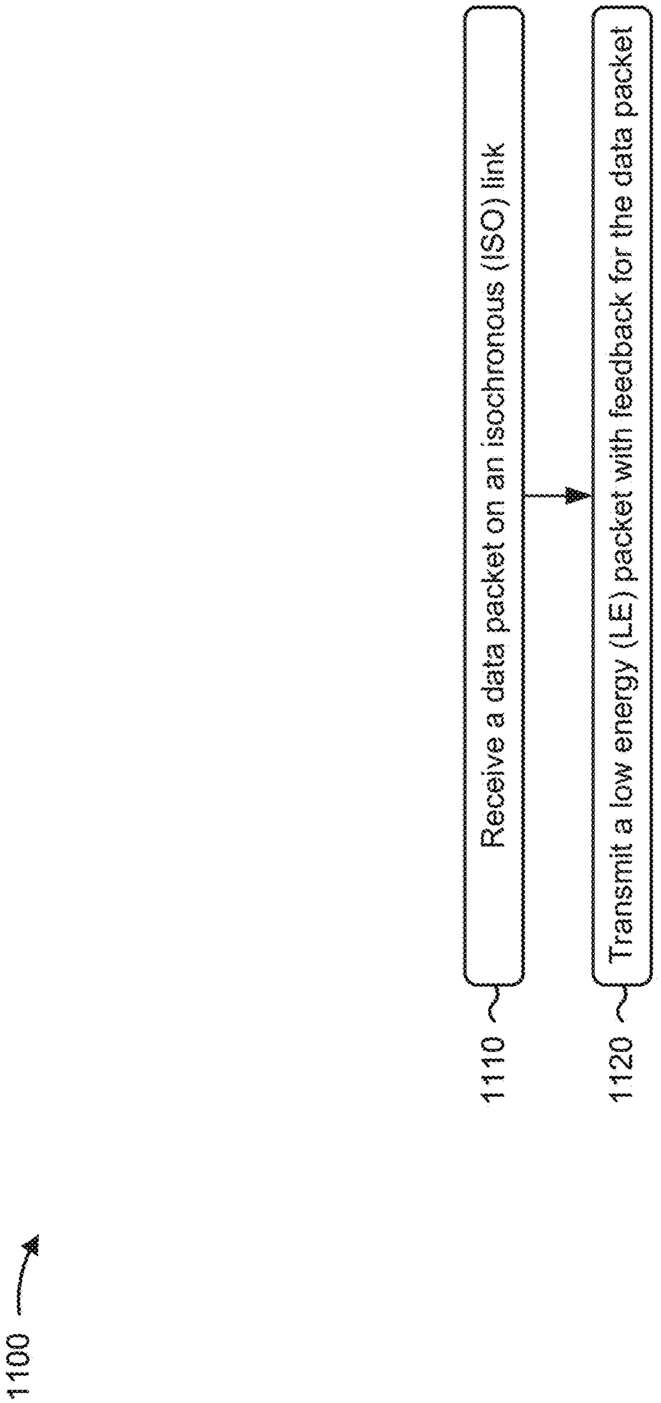
FIG. 11 is a diagram illustrating an example process performed, for example, at a wireless device or an apparatus of a wireless device, in accordance with the present disclosure.

FIG. 11 is a diagram illustrating an example process 1100 performed, for example, at a wireless device or an apparatus of a wireless device, in accordance with the present disclosure. Example process 1100 is an example where the apparatus or the wireless device (e.g., central device, peripheral device) performs operations associated with low energy packet scheduling.

As shown in FIG. 11, in some aspects, process 1100 may include receiving a data packet on an ISO link (block 1110). For example, the wireless device (e.g., using reception component 1302 and/or communication manager 1306, depicted in FIG. 13) may receive a data packet on an ISO link, as described above.

As further shown in FIG. 11, in some aspects, process 1100 may include transmitting an LE packet with feedback for the data packet (block 1120). For example, the wireless device (e.g., using transmission component 1304 and/or communication manager 1306, depicted in FIG. 13) may transmit an LE packet with feedback for the data packet, as described above.

Process 1100 may include additional aspects, such as any single aspect or any combination of aspects described below and/or in connection with one or more other processes described elsewhere herein.

In a first aspect, transmitting the LE packet includes transmitting the LE packet earlier than an LE event prescheduled for transmitting the LE packet.

In a second aspect, alone or in combination with the first aspect, process 1100 includes transmitting an indication that the LE packet is to be transmitted in an ISO subevent that is earlier than an LE event prescheduled for transmitting the LE packet.

In a third aspect, alone or in combination with one or more of the first and second aspects, the ISO subevent is after previous ISO subevents where all ISO data packets are received.

In a fourth aspect, alone or in combination with one or more of the first through third aspects, process 1100 includes adjusting a packet counter starting value for each ISO event.

In a fifth aspect, alone or in combination with one or more of the first through fourth aspects, transmitting the LE packet includes transmitting the LE packet in a same ISO subevent in which the ISO data packet is received.

In a sixth aspect, alone or in combination with one or more of the first through fifth aspects, process 1100 includes increasing a size of ISO subevents configured for an ISO interval.

In a seventh aspect, alone or in combination with one or more of the first through sixth aspects, transmitting the LE packet includes transmitting the LE packet based at least in part on a determination that there is no more data to be transmitted or received on the ISO link.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
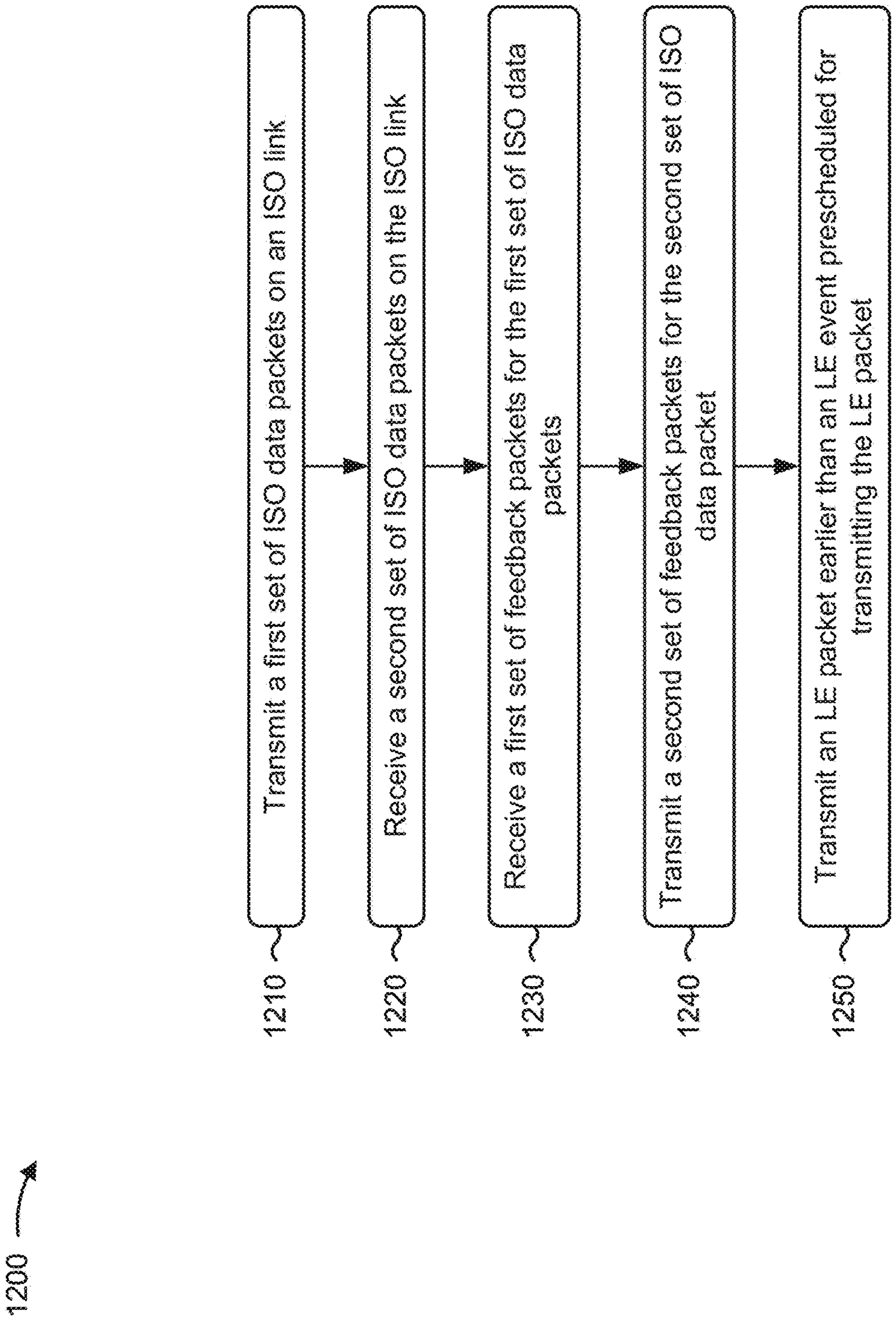
FIG. 12 is a diagram illustrating an example process performed, for example, at a wireless device or an apparatus of a wireless device, in accordance with the present disclosure.

FIG. 12 is a diagram illustrating an example process 1200 performed, for example, at a wireless device or an apparatus of a wireless device, in accordance with the present disclosure. Example process 1200 is an example where the apparatus or the wireless device (e.g., central device, peripheral device) performs operations associated with low energy packet scheduling.

As shown in FIG. 12, in some aspects, process 1200 may include transmitting a first set of ISO data packets on an ISO link (block 1210). For example, the wireless device (e.g., using transmission component 1304 and/or communication manager 1306, depicted in FIG. 13) may transmit a first set of ISO data packets on an ISO link, as described above.

As further shown in FIG. 12, in some aspects, process 1200 may include receiving a second set of ISO data packets on the ISO link (block 1220). For example, the wireless device (e.g., using reception component 1302 and/or communication manager 1306, depicted in FIG. 13) may receive a second set of ISO data packets on the ISO link, as described above.

As further shown in FIG. 12, in some aspects, process 1200 may include receiving a first set of feedback packets for the first set of ISO data packets (block 1230). For example, the wireless device (e.g., using reception component 1302 and/or communication manager 1306, depicted in FIG. 13) may receive a first set of feedback packets for the first set of ISO data packets, as described above.

As further shown in FIG. 12, in some aspects, process 1200 may include transmitting a second set of feedback packets for the second set of ISO data packet (block 1240). For example, the wireless device (e.g., using transmission component 1304 and/or communication manager 1306, depicted in FIG. 13) may transmit a second set of feedback packets for the second set of ISO data packet, as described above.

As further shown in FIG. 12, in some aspects, process 1200 may include transmitting an LE packet earlier than an LE event prescheduled for transmitting the LE packet (block 1250). For example, the wireless device (e.g., using transmission component 1304 and/or communication manager 1306, depicted in FIG. 13) may transmit an LE packet earlier than an LE event prescheduled for transmitting the LE packet, as described above.

Process 1200 may include additional aspects, such as any single aspect or any combination of aspects described below and/or in connection with one or more other processes described elsewhere herein.

In a first aspect, process 1200 includes moving an LE anchor point associated with the LE event to a next ISO subevent start time.

In a second aspect, alone or in combination with the first aspect, transmitting the LE packet includes transmitting the LE packet in a next ISO subevent after an ISO subevent in which a last feedback packet of the second set of feedback packets is transmitted.

In a third aspect, alone or in combination with one or more of the first and second aspects, process 1200 includes transmitting an indication that the LE packet is to be transmitted in an ISO subevent that is earlier than the LE event prescheduled for transmitting the LE packet.

In a fourth aspect, alone or in combination with one or more of the first through third aspects, transmitting the LE packet includes transmitting the LE packet with regular LE link parameters.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
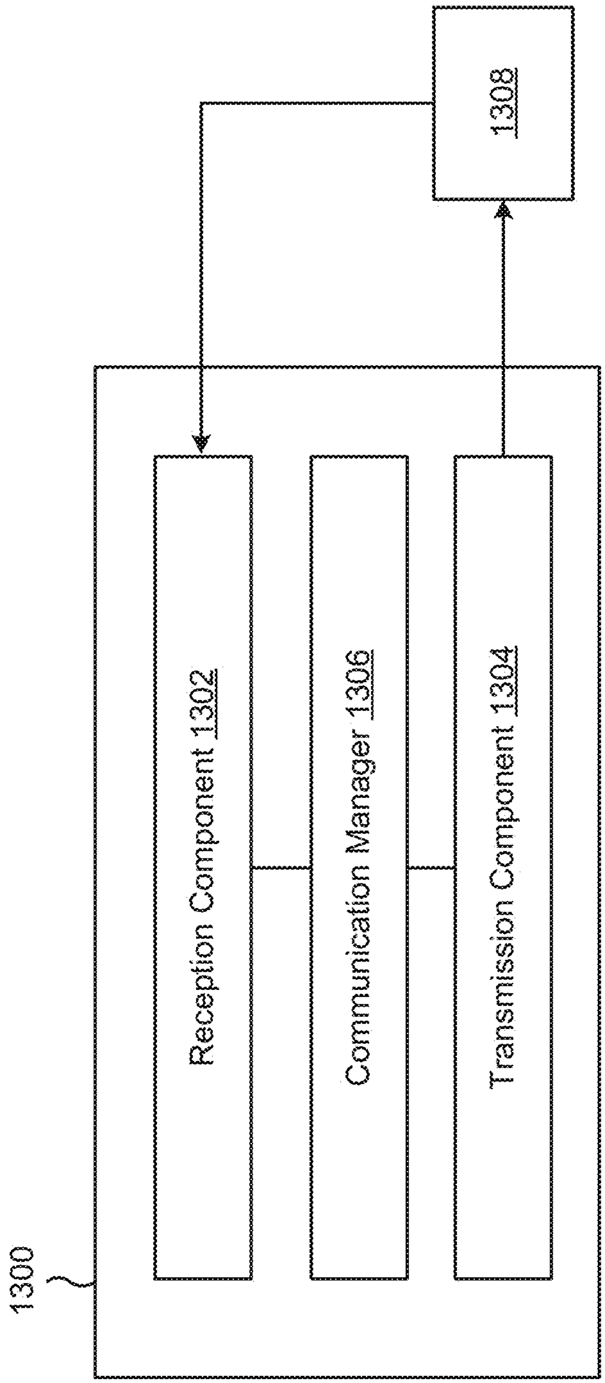
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a wireless device (e.g., central device, peripheral device), or a wireless device may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the WPAN controller 252 described in connection with FIG. 2 or other communication manager of a central device. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 1-10. Additionally, or alternatively, the apparatus 1300 may be configured to perform one or more processes described herein, such as process 1100 of FIG. 11, process 1200 of FIG. 12, or a combination thereof. In some aspects, the apparatus 1300 and/or one or more components shown in FIG. 13 may include one or more components of the wireless device described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, one or more modems, one or more demodulators, one or more MIMO detectors, one or more receive processors, one or more controllers/processors, one or more memories, or a combination thereof, of the wireless device described in connection with FIG. 2.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, one or more modems, one or more modulators, one or more transmit MIMO processors, one or more transmit processors, one or more controllers/processors, one or more memories, or a combination thereof, of the wireless device described in connection with FIG. 2. In some aspects, the transmission component 1304 may be co-located with the reception component 1302 in one or more transceivers.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

In some aspects, the reception component 1302 may receive a data packet on an ISO link. The transmission component 1304 may transmit an LE packet with feedback for the data packet.

The transmission component 1304 may transmit an indication that the LE packet is to be transmitted in an ISO subevent that is earlier than an LE event prescheduled for transmitting the LE packet.

The communication manager 1306 may adjust a packet counter starting value for each ISO event. The communication manager 1306 may increase a size of ISO subevents configured for an ISO interval.

In some aspects, the transmission component 1304 may transmit a first set of ISO data packets on an ISO link. The reception component 1302 may receive a second set of ISO data packets on the ISO link. The reception component 1302 may receive a first set of feedback packets for the first set of ISO data packets. The transmission component 1304 may transmit a second set of feedback packets for the second set of ISO data packet. The transmission component 1304 may transmit an LE packet earlier than an LE event prescheduled for transmitting the LE packet.

The communication manager 1306 may move an LE anchor point associated with the LE event to a next ISO subevent start time. The transmission component 1304 may transmit an indication that the LE packet is to be transmitted in an ISO subevent that is earlier than the LE event prescheduled for transmitting the LE packet.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a wireless device, comprising: receiving a data packet on an isochronous (ISO) link; and transmitting a low energy (LE) packet with feedback for the data packet.

Aspect 2: The method of Aspect 1, wherein transmitting the LE packet includes transmitting the LE packet earlier than an LE event prescheduled for transmitting the LE packet.

Aspect 3: The method of any of Aspects 1-2, further comprising transmitting an indication that the LE packet is to be transmitted in an ISO subevent that is earlier than an LE event prescheduled for transmitting the LE packet.

Aspect 4: The method of Aspect 3, wherein the ISO subevent is after previous ISO subevents where all ISO data packets are received.

Aspect 5: The method of any of Aspects 1-4, further comprising adjusting a packet counter starting value for each ISO event.

Aspect 6: The method of any of Aspects 1-5, wherein transmitting the LE packet includes transmitting the LE packet in a same ISO subevent in which the ISO data packet is received.

Aspect 7: The method of Aspect 6, further comprising increasing a size of ISO subevents configured for an ISO interval.

Aspect 8: The method of Aspect 6, wherein transmitting the LE packet includes transmitting the LE packet based at least in part on a determination that there is no more data to be transmitted or received on the ISO link.

Aspect 9: A method of wireless communication performed by a wireless device, comprising: transmitting a first set of ISO data packets on an isochronous (ISO) link; receiving a second set of ISO data packets on the ISO link; receiving a first set of feedback packets for the first set of ISO data packets; transmitting a second set of feedback packets for the second set of ISO data packet; and transmitting a low energy (LE) packet earlier than an LE event prescheduled for transmitting the LE packet.

Aspect 10: The method of Aspect 9, further comprising moving an LE anchor point associated with the LE event to a next ISO subevent start time.

Aspect 11: The method of any of Aspects 9-10, wherein transmitting the LE packet includes transmitting the LE packet in a next ISO subevent after an ISO subevent in which a last feedback packet of the second set of feedback packets is transmitted.

Aspect 12: The method of any of Aspects 9-11, further comprising transmitting an indication that the LE packet is to be transmitted in an ISO subevent that is earlier than the LE event prescheduled for transmitting the LE packet.

Aspect 13: The method of any of Aspects 9-12, wherein transmitting the LE packet includes transmitting the LE packet with regular LE link parameters.

Aspect 14: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-13.

Aspect 15: An apparatus for wireless communication at a device, the apparatus comprising one or more memories and one or more processors coupled to the one or more memories, the one or more processors configured to cause the device to perform the method of one or more of Aspects 1-13.

Aspect 16: An apparatus for wireless communication, the apparatus comprising at least one means for performing the method of one or more of Aspects 1-13.

Aspect 17: A non-transitory computer-readable medium storing code for wireless communication, the code comprising instructions executable by one or more processors to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

Aspect 19: A device for wireless communication, the device comprising a processing system that includes one or more processors and one or more memories coupled with the one or more processors, the processing system configured to cause the device to perform the method of one or more of Aspects 1-13.

Aspect 20: An apparatus for wireless communication at a device, the apparatus comprising one or more memories and one or more processors coupled to the one or more memories, the one or more processors individually or collectively configured to cause the device to perform the method of one or more of Aspects 1-13.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a wireless device, comprising:
one or more memories; and
one or more processors, coupled to the one or more memories, individually or collectively configured to cause the wireless device to:
receive, from a second wireless device, an isochronous (ISO) data packet on an ISO link; and
transmit, to the second wireless device, a low energy (LE) packet and feedback for the ISO data packet together in an ISO subevent earlier than an LE event prescheduled for transmitting the LE packet, wherein the LE packet is a Bluetooth Low Energy packet comprising sensor data or control information.

2. The apparatus of claim 1, wherein the one or more processors are individually or collectively configured to cause the wireless device to transmit an indication that the LE packet is to be transmitted in the ISO subevent that is earlier than the LE event prescheduled for transmitting the LE packet.

3. The apparatus of claim 2, wherein the ISO subevent is after previous ISO subevents where all ISO data packets are received.

4. The apparatus of claim 1, wherein the one or more processors are individually or collectively configured to cause the wireless device to adjust a packet counter starting value for each ISO event.

5. The apparatus of claim 1, wherein to transmit the LE packet, the one or more processors are individually or collectively configured to cause the wireless device to transmit the LE packet in a same ISO subevent in which the ISO data packet is received.

6. The apparatus of claim 5, wherein the one or more processors are individually or collectively configured to cause the wireless device to increase a size of ISO subevents configured for an ISO interval.

7. The apparatus of claim 5, wherein to transmit the LE packet, the one or more processors are configured to cause the wireless device to transmit the LE packet based at least in part on a determination that there is no more data to be transmitted or received on the ISO link.

8. The apparatus of claim 1, wherein the wireless device is a central device and the second wireless device is a peripheral device.

9. The apparatus of claim 1, wherein the wireless device is a peripheral device and the second wireless device is a central device.

10. An apparatus for wireless communication at a wireless device, comprising:
one or more memories; and
one or more processors, coupled to the one or more memories, individually or collectively configured to cause the wireless device to:
transmit, to a second wireless device, a first set of ISO data packets on an isochronous (ISO) link;
receive, from the second wireless device, a second set of ISO data packets on the ISO link;
receive, from the second wireless device, a first set of feedback packets for the first set of ISO data packets;
transmit, to the second wireless device, a second set of feedback packets for the second set of ISO data packet; and
transmit, to the second wireless device, a low energy (LE) packet in an ISO subevent earlier than an LE event prescheduled for transmitting the LE packet, wherein the LE packet is a Bluetooth Low Energy packet comprising sensor data or control information.

11. The apparatus of claim 10, wherein the one or more processors are individually or collectively configured to cause the wireless device to move an LE anchor point associated with the LE event to a next ISO subevent start time.

12. The apparatus of claim 10, wherein to transmit the LE packet, the one or more processors are individually or collectively configured to cause the wireless device to transmit the LE packet in the ISO subevent after an ISO subevent in which a last feedback packet of the second set of feedback packets is transmitted.

13. The apparatus of claim 10, wherein the one or more processors are individually or collectively configured to cause the wireless device to transmit an indication that the LE packet is to be transmitted in the ISO subevent that is earlier than the LE event prescheduled for transmitting the LE packet.

14. The apparatus of claim 10, wherein to transmit the LE packet, the one or more processors are individually or collectively configured to cause the wireless device to transmit the LE packet with regular LE link parameters.

15. A method of wireless communication performed by a wireless device, comprising:
receiving, from a second wireless device, an isochronous (ISO) data packet on an ISO link; and
transmitting, to the second wireless device, a low energy (LE) packet and feedback for the ISQ data packet together in an ISO subevent earlier than an LE event prescheduled for transmitting the LE packet, wherein the LE packet is a Bluetooth Low Energy packet comprising sensor data or control information.

16. The method of claim 15, further comprising transmitting an indication that the LE packet is to be transmitted in the ISO subevent that is earlier than the LE event prescheduled for transmitting the LE packet.

17. The method of claim 16, wherein the ISO subevent is after previous ISO subevents where all ISO data packets are received.

18. The method of claim 15, further comprising adjusting a packet counter starting value for each ISO event.

19. The method of claim 15, wherein transmitting the LE packet includes transmitting the LE packet in a same ISO subevent in which the ISO data packet is received.

20. The method of claim 19, further comprising increasing a size of ISO subevents configured for an ISO interval.

21. The method of claim 19, wherein transmitting the LE packet includes transmitting the LE packet based at least in part on a determination that there is no more data to be transmitted or received on the ISO link.

22. A method of wireless communication performed by a wireless device, comprising:
transmitting, to a second wireless device, a first set of ISO data packets on an isochronous (ISO) link;
receiving, from the second wireless device, a second set of ISO data packets on the ISO link;
receiving, from the second wireless device, a first set of feedback packets for the first set of ISO data packets;

transmitting, to the second wireless device, a second set of feedback packets for the second set of ISO data packet; and transmitting, to the second wireless device, a low energy (LE) packet in an ISO subevent earlier than an LE event prescheduled for transmitting the LE packet, wherein the LE packet is a Bluetooth Low Energy packet comprising sensor data or control information.

23. The method of claim 22, further comprising moving an LE anchor point associated with the LE event to a next ISO subevent start time.

24. The method of claim 22, wherein transmitting the LE packet includes transmitting the LE packet in the ISO subevent after an ISO subevent in which a last feedback packet of the second set of feedback packets is transmitted.

25. The method of claim 22, further comprising transmitting an indication that the LE packet is to be transmitted in the ISO subevent that is earlier than the LE event prescheduled for transmitting the LE packet.

26. The method of claim 22, wherein transmitting the LE packet includes transmitting the LE packet with regular LE link parameters.

* * * * *